United States Patent [19]

Orita et al.

[11] Patent Number: 5,003,616

[45] Date of Patent: Mar. 26, 1991

[54] IMAGE PROCESSING APPARATUS

[75] Inventors: Miyahiko Orita, Hitachi; Morio Kanasaki, Katsuta; Yuji Toda; Tadaaki Mishima, both of Hitachi; Masato Suzuki, Katsuta; Chieko Onuma, Ibaraki; Masao Takatoo, Katsuta, all of Japan

[73] Assignee: Hitachi, Ltd., Tokyo, Japan

[21] Appl. No.: 203,643

[22] Filed: May 31, 1988

Related U.S. Application Data

[63] Continuation of Ser. No. 853,449, Apr. 17, 1986, abandoned.

[30] Foreign Application Priority Data

Apr. 17, 1985 [JP] Japan .................................. 60-80203
Mar. 5, 1986 [JP] Japan .................................. 61-46178

[51] Int. Cl.$^5$ ............................................. G06K 9/00
[52] U.S. Cl. ...................................... 382/41; 340/707; 358/106; 382/48; 382/50; 382/54
[58] Field of Search ..................... 382/41, 48, 38, 61, 382/50, 54, 57, 9; 358/106; 340/707

[56] References Cited

U.S. PATENT DOCUMENTS

| 3,638,188 | 1/1972 | Pincoffs | 382/26 |
| 3,715,724 | 2/1973 | Demonte et al. | 382/38 |
| 3,973,239 | 8/1976 | Kakumoto | 382/50 |
| 4,051,458 | 9/1977 | Morton | 382/54 |
| 4,075,604 | 2/1978 | Degasperi | 382/18 |
| 4,243,972 | 1/1981 | Toussaint | 340/707 |
| 4,302,672 | 11/1981 | Kato | 382/54 |
| 4,317,179 | 2/1982 | Kato | 382/54 |
| 4,335,427 | 6/1982 | Hunt | 382/54 |
| 4,395,707 | 7/1983 | Satrapa | 340/707 |
| 4,411,015 | 10/1983 | Scherl | 382/51 |
| 4,550,435 | 10/1985 | Hayman | 382/22 |
| 4,589,144 | 5/1986 | Namba | 382/61 |
| 4,592,089 | 5/1986 | Hartman | 382/48 |
| 4,658,429 | 4/1987 | Orita | 382/36 |

OTHER PUBLICATIONS

IEEE Transactions on Computers, vol. C-25, No. 12, Dec. 1976, pp. 1336-1346, IEEE, N.Y., U.S.A.; K.-S. Fu and A. Rosenfeld: "Pattern Recognition and Image Processing", p. 1338, col. 1, lines 10-31; p. 1340, col. 1, line 33, col. 2, line 5; p. 1342, col. 2, lines 24-45.

IEEE Proceedings of the First International Joint Conference on Pattern Recognition, Oct./Nov. 1973, pp. 499-503, IEEE, N.Y., U.S.A.; M. Nagao, et al.: "Automatic Model Generation and Recognition of Simple Three Dimensional Bodies", p. 499, col. 1, ln. 46, col. 2, ln. 6; p. 499, col. 2, lines 33-43.

Parallel Computers-Parallel Mathematics, Proceedings of the IMACS (AICA) Gi Symposium, Mar. 1977, Munich, Editor M. Feilmeier, pp. 247-256.

North-Holland Publishing Co., Amsterdam, NL; A. K. Singhania and P. B. Berra: "Associative Processor Application to Change Detection", p. 247.

IEEE Transactions on Nuclear Science, vol. NS-29, No. 3, Jun. 1982, pp. 1198-1207, IEEE, N.Y., U.S.A.; R.H. Selzer et al.: "Computer Assessment of Atherosclerosis from Angiographic Images", FIGS. 5, 6, 9, 10.

*Primary Examiner*—Leo H. Boudreau
*Attorney, Agent, or Firm*—Antonelli, Terry, Stout & Kraus

[57] ABSTRACT

An image processing apparatus having a character extraction unit for extracting an area whose density distribution characteristic meets a predetermined condition such as a binarization threshold and a size and a type of local filtering, from an input image of multiple gray levels, and extracts an object area as an output image from the input image by using the characteristic extraction unit. An area designation means designates an area having a uniform density distribution and containing the object area, to the input image. Condition determination means determines the condition for the characteristic extraction unit based on the density distribution characteristic of the input image in the designated area. In an image processing expert system, the image characteristics of the object image and the background in the area designated by the area designation means are evaluated and analyzed and the inquiry in the form of message is effected to quantize the evaluation of the image characteristic. As a result, the area extraction procedure can be easily executed by the interaction with an operator.

10 Claims, 20 Drawing Sheets

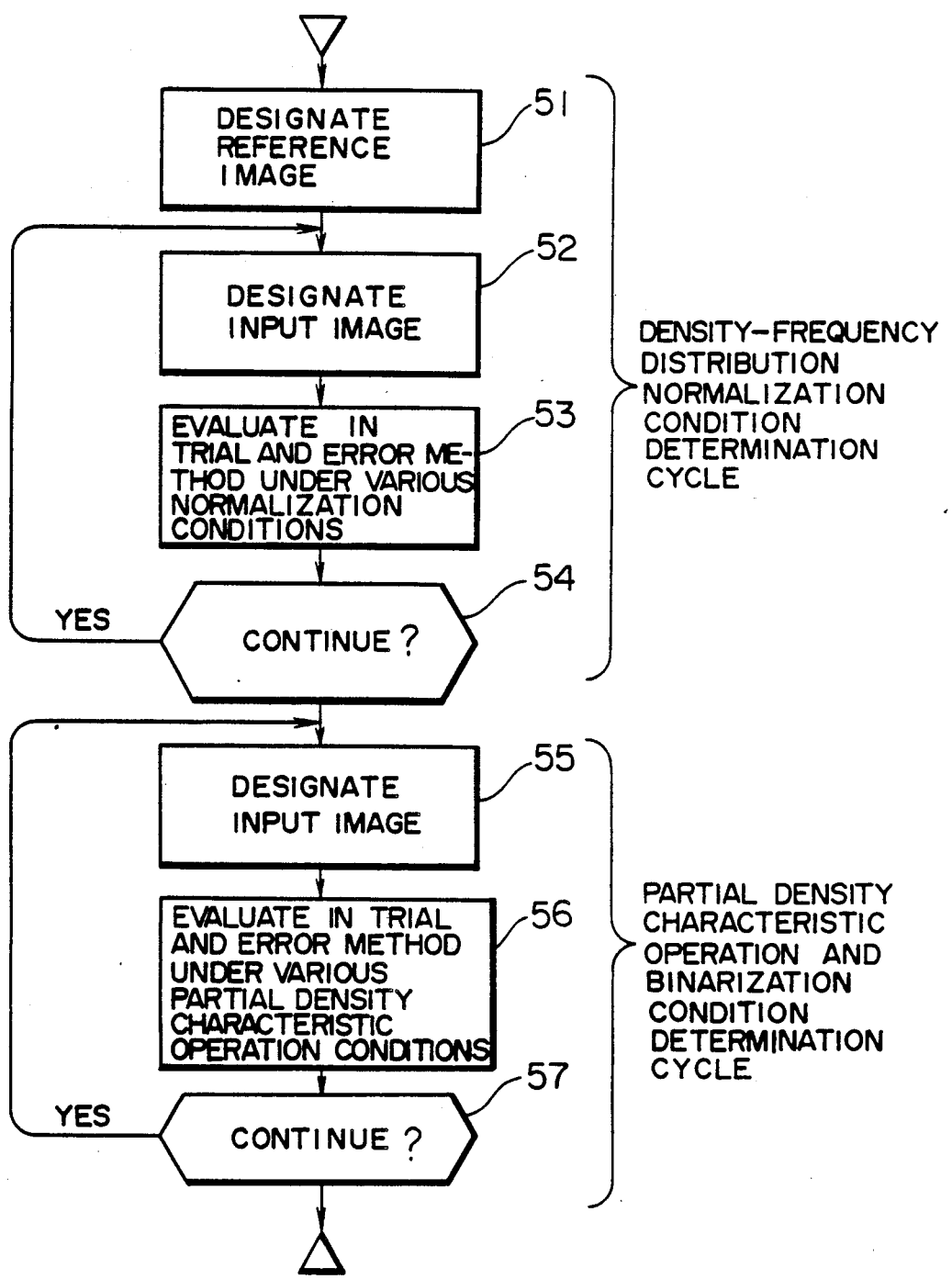

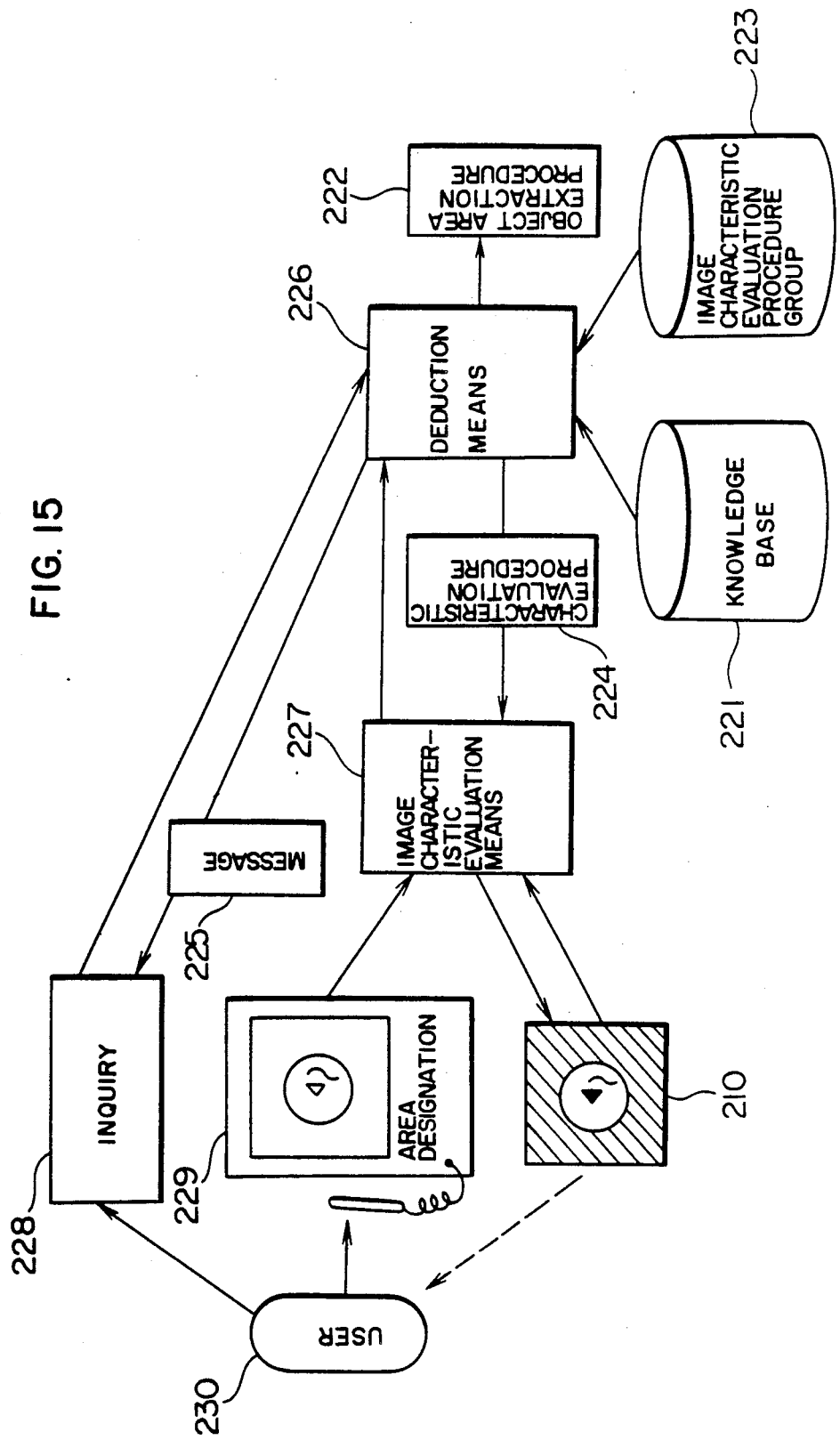

IMAGE PROCESSING APPARATUS

This application is a continuation of application Ser. No. 853,449, filed on Apr. 17, 1986, now abandoned.

BACKGROUND OF THE INVENTION

The present invention relates to an image processing apparatus which receives and recognizes an image of an object, and more particularly to characteristic extraction or segmentation which extracts an object area based on a density distribution characteristic derived from an input image.

In the area of factory automation (FA), there is a strong need to automatize a visual test such as testing of a printed circuit board or testing of foreign material in a medicine by image processing. In response thereto, various image processing (recognition) apparatus have been developed to meet such needs. In such image processing apparatus in which noise is eliminated from an input image during a pre-processing step, an object area is extracted and the object area is recognized. In a test for a defect of a medicine, for example, a tablet area is located from an input image, a defect area of the tablet is extracted and the defect is recognized.

In such an image processing apparatus, much manpower and time are required to develop an object recognition algorithm and program. An example of such a software is disclosed in "Development of General Purpose Image Processing Apparatus-Software" by N. Satoh, T. Gotoh et al., the 28th (first half of 1984) National Conference of The Association of Japan Information Processing, Paper No. 4N-98, pages 995-996. However, a long time is necessarily required to develop the disclosed software even for experts.

With respect to the above processes, the development of a segmentation program to extract the object area from the input image is very difficult hard and time-consuming to a user of the image processing apparatus.

The segmentation means used for the visual test generally comprises three steps: (1) normalization of density-frequency distribution, (2) extraction by feature measurement of local density distribution, and (3) final extraction by geometrical feature measurement.

In the normalization of the density-frequency distribution of the step (1), pre-processing such as elimination of a noise from an input image is carried out. The density distribution of the input image is parallelly shifted to a reference condition based on an average density or a density at a characteristic point such as a peak frequency, or enlarged or reduced to the reference condition based on a density at a characteristic point so that the density-frequency distribution follows an illumination intensity of a test object and a change in a contrast of the test object and a background.

The characteristic point used in the parallel shift may be a minimum/maximum density level of the image, a midpoint of the minimum and maximum density levels, an average density level, a density level for a maximum frequency, a density level for an intermediate one of peaks in the density-frequency distribution, or a density level for a minimum or maximum one of the peaks in the density-frequency distribution, and the characteristic point used in the enlargement/reduction is a combination of a plurality of characteristic points described above. Accordingly, the number of occasions is larger than that for the parallel shift. In searching the peak in the density-frequency distribution, only large peaks may be searched, only small peaks may be searched or both may be searched. The user alternately repeats the development of the program and the experiment to detect the characteristic points to accomplish the normalization of the density-frequency distribution of the step (1).

In the extraction by the feature measurement of the local density distribution, a candidate object area is extracted from a specific density distribution or a two-dimension distribution of the specific density for the density-normalized image of the step (1). Usually, the feature measurement of the density distribution in a partial image is calculated and it is stored as a new density around the partial image. This is called a filtering and space product-sum operation (local density characteristic operation), and it is performed with respect to each pixel of the object image and the results thereof are binarized by a predetermined threshold.

The feature measurement of the density distribution calculated in the partial image may be an average density of the partial image, the number of pixels having a particular density, an average density after horizontal, vertical and diagonal partial differentiation, the number of pixels having a particular density after such a differentiation, the number of pixels having the particular density in the average density image, a maximum, minimum or intermediate density in the partial image or maximum/minimum densities in the partial image. The user alternately repeats the development of the program and the experiment to find an optimum feature measurement in the partial image to accomplish the extraction of the candidate areas based on the characteristic of the density distribution.

In the final extraction by the geometrical feature measurement, only those of the candidate areas extracted in the step (2) which have a specific geometrical feature such as a predetermined range of area, peripheral length or (peripheral length)$^2$/area are extracted. The step (3) has been well studied in the past and various practical methods have been proposed. Accordingly, it is not explained here.

The program development works in the steps (1) and (2) take one to two months even if they were done by experts of programming and image processing. If a user having little knowledge on the image processing develops an application program by a trial and error method, a test line of the object product may be substantially changed and the application program may become useless.

The steps (1) and (2) are collectively called segmentation by characteristic of density distribution, or characteristic extraction.

An image processing technique relating to the present invention is an image processing expert system in which an image processing procedure can be determined through repetitive simple interaction with the user by using a prestored knowledge base of image processing experts. Such a system is shown in "Three Types of Knowledge for Image Analysis Expert System" by Tamura and Sakagami, Electronics and Electrical Communication Association of Japan, AL 83-49 (1983), and "Image Processing Expert System" by Sueda, Mikame and Katagiri, TOSHIBA REVIEW, Vol. 40, No. 5, pages 403-406 (1985).

On the other hand, in "Method for Automatically Structuring an Image Processing Procedure by Presentation of Sample Patterns and Application Thereof to Structuring a Linear Pattern Extraction Procedure" by Hasegawa, Kubota and Toriwaki, Electronics and Electrical Communication Association of Japan, PRL 85-38 (1985), a characteristic of an image to be extracted is inputted in a form of image or sample pattern instead of abstract wording. The latter two articles are referenced herein not as prior art but to aid in the comprehension of the present invention.

SUMMARY OF THE INVENTION

It is an object of the present invention to provide an image processing method and apparatus which can readily determine various conditions necessary for segmentation for extracting an object area by using a characteristic of a density distribution, by merely reading a partial area containing the object area in an input image.

It is another object of the present invention to provide an image processing method and apparatus which quantizes the evaluation of an image characteristic, particularly the observation of the image or analysis of data, which has been difficult to attain in the prior art image processing expert system, by utilizing the condition determination technique for the characteristic extraction so that an appropriate procedure which is not influenced by a subject of the user can be determined.

In accordance with a feature of the present invention, there is provided an image processing apparatus comprising segmentation means for extracting an area whose characteristic of a density distribution meets a predetermined condition, from an input image having multiple gray levels or multi-gradation, to thereby extract an object area from the input image, and designation means for picking up or designating a limited area containing at least the object area in the input image and having a uniform density characteristic. The optimum conditions of the segmentation means is determined in accordance with the characteristic of the designated uniform density characteristic area. The condition can be a threshold for coding the image in two levels and the size and type of local filtering.

In accordance with another feature of the present invention, there is provided an image processing apparatus which comprises area designation means capable of inputting a partial pattern area, such as an object area in the input image, image characteristic evaluation means for evaluating and analyzing the image characteristic, such as the object area or background in the designated area in accordance with a predetermined procedure, and means for coupling the evaluation means to a man-machine inquiry means.

BRIEF DESCRIPTION OF THE DRAWINGS

FIG. 15 shows an overall configuration of an image processing expert system in accordance with the present invention.

DESCRIPTION OF THE PREFERRED EMBODIMENTS

Figure 1:
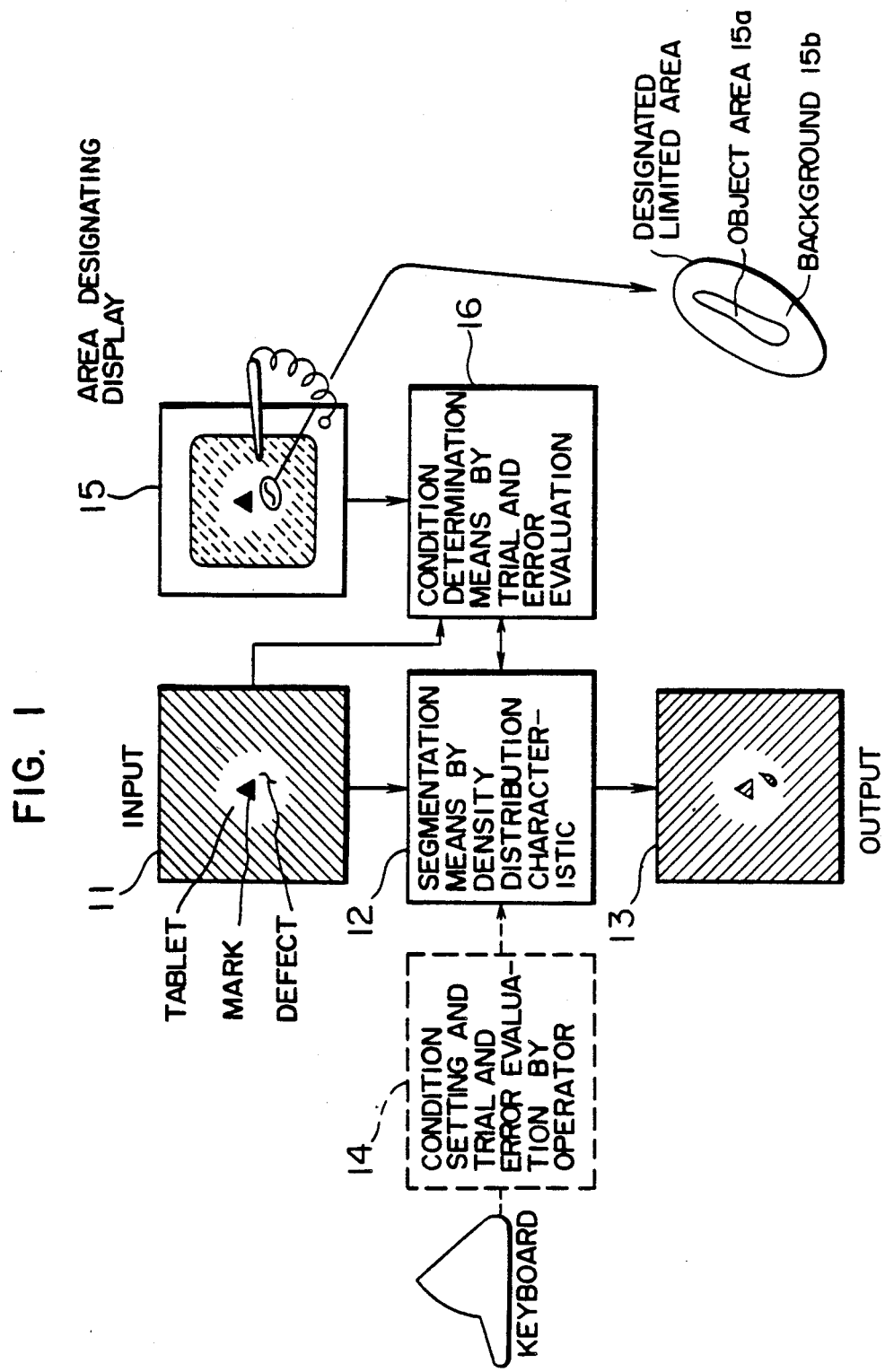
FIG. 1 is a conceptual view of the present invention.

FIG. 1 shows a basic concept of the present invention. As an application of the image processing in FIG. 1, a test for a defect in a tablet is considered, although the present invention is applicable to extract a character in a background, for example.

According to a conventional prior art method, an input image 11 which contains tablet defect (object area having multiple gray levels) is provided, and a user or operator sets various parameters such as selecting a peak for a maximum frequency as a characteristic point to be searched in density distribution normalization process or selecting a partial averaging process as a partial density characteristic operation, based on knowledge or experience of the operator or in accordance with an operation manual. The operator develops a program by which the parameters thus set are reflected to segmentation means 12, has it executed and evaluates a resulting binary image 13. The operator repeats the above steps until a desired result is obtained (block 14 in FIG. 1).

Such an effort is expensive because it requires a long period of time and the algorithm that is developed is not correct because the evaluation by the operator is subjective.

In the present invention, in order to resolve the above problems, the step of condition setting and trial and error evaluation by the operator (block 14) is eliminated, and area designation means 15 for designating an area containing an object area (defect of a tablet) in an input image is provided, and information of the image is limited only to a density distribution of the object area 15a designated by the area designation means 15 or a density distribution of the object area 15a and a background 15b, out of a density distribution of the entire input image, and condition setting of segmentation means 12 which separates the object area and the background is automatized by using condition determination means 16 by trial and error evaluation.

The condition setting of the segmentation means 12 by the density distribution characteristic needs a huge number of steps if it is done by the operator by the program in trial and error method, and would take several weeks to several months. Thus, the area designation means 15 is provided, and from a relationship between the object area 15a and the background 15b, a condition under which the object area and the background are best separated is selected by a computer from present conditions based upon a predetermined evaluation measurement.

Figure 2:
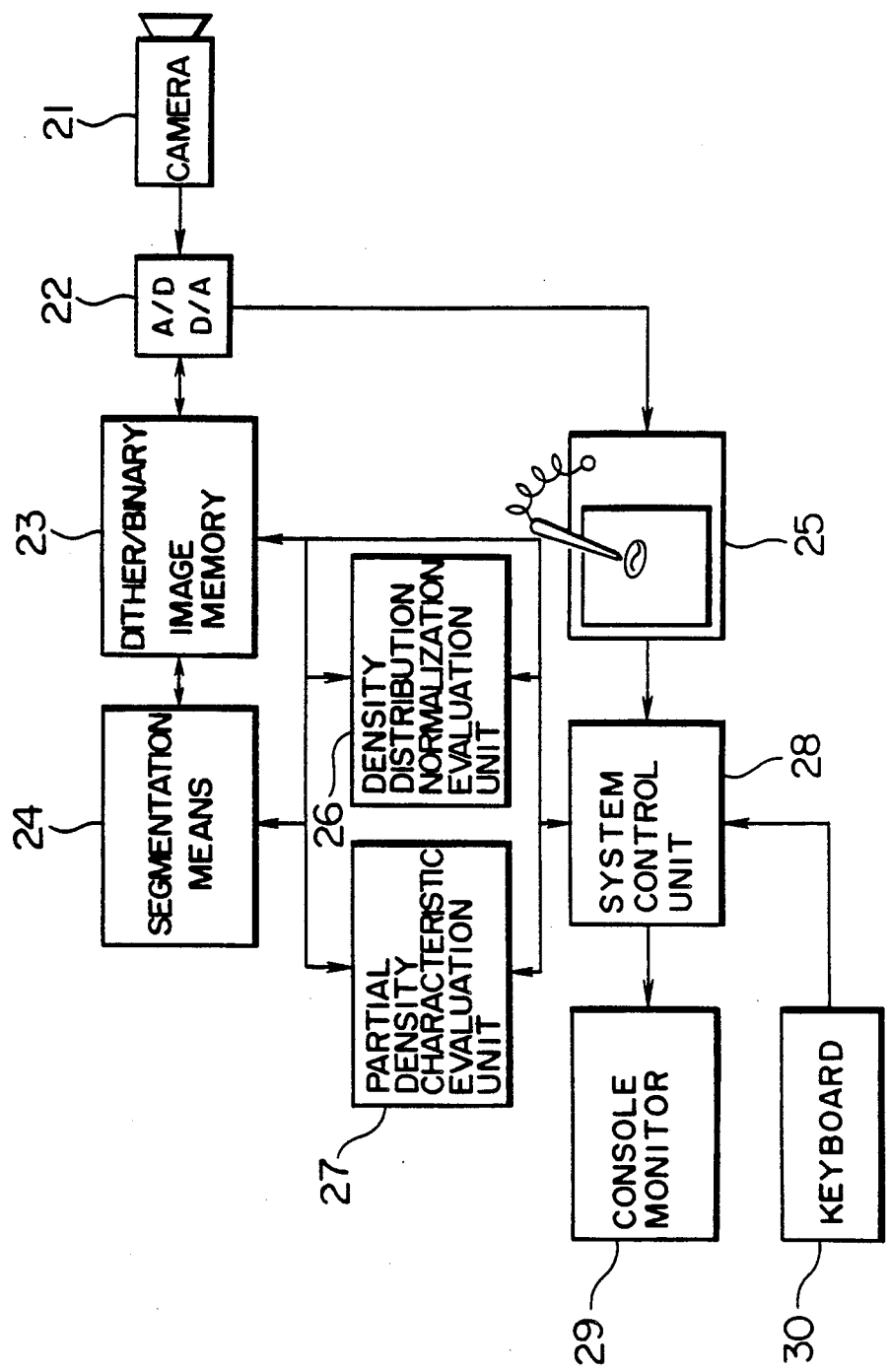
FIG. 2 shows an overall configuration of an embodiment of the present invention.

Referring to FIG. 2, an overall configuration of an embodiment of the image processing apparatus is explained.

The present embodiment comprises a television camera 21 for imaging an object area, an A/D-D/A converter 22 for converting an analog signal of the television camera 21 to a digital signal and converting a digital signal to an analog signal, a dither/binary image memory 23 for storing an input multi-gray-level image and a binary image of the object area, segmentation means 24 for extracting those areas from the input multi-gray-level image stored in the dither/binary image memory 23 whose density distribution characteristics meet a predetermined condition and storing them as binary image in the dither/binary image memory 23, area designation means 25 on which the dither/binary images are displayed and, which allows the operator to designate an area containing the object area, density distribution normalization evaluation unit 26 for determining optimum conditions necessary for the density-frequency distribution normalization process of the segmentation means 24 by evaluating, in the trial and error method, conditions assumed for a plurality of input images, a partial density characteristic evaluation unit 27 for determining the optimum conditions necessary for the partial density characteristic operation and the final binarization of the segmentation means 24 by evaluating, in the trial and error method, the conditions assumed for a plurality of input images, a system control unit 28 for controlling an entire system, a console monitor 29 which displays characters, and a keyboard 30 through which the operator enters data.

The condition determination means 16 by trial and error evaluation of FIG. 1 corresponds to the density distribution normalization evaluation unit 26, partial density characteristic evaluation unit 27 and the system control unit 28 of FIG. 2. The area designation means 25 (15 in FIG. 1) usually comprises a cathode ray tube (CRT) and coordinate input means such as tablet or mouse, and it may be a combination of digitizer, track ball and light pen (disclosed in U.S. Ser. Nos. 716943 and 716944 filed on Mar. 28, 1985 (EP 85103643.4 and EP 85103823.2) filed by the assignee of the present invention) or other man-machine interface such as an input integrated flat display which is a recently developed coordinate input medium. The coordinates may be directly designated by the keyboard. Any means which can designate the object area may be used.

Before the overall operation is described, an internal configuration of the segmentation means 24 and functions and operations of the respective blocks are explained with reference to FIGS. 3 and 4.

Figure 3:
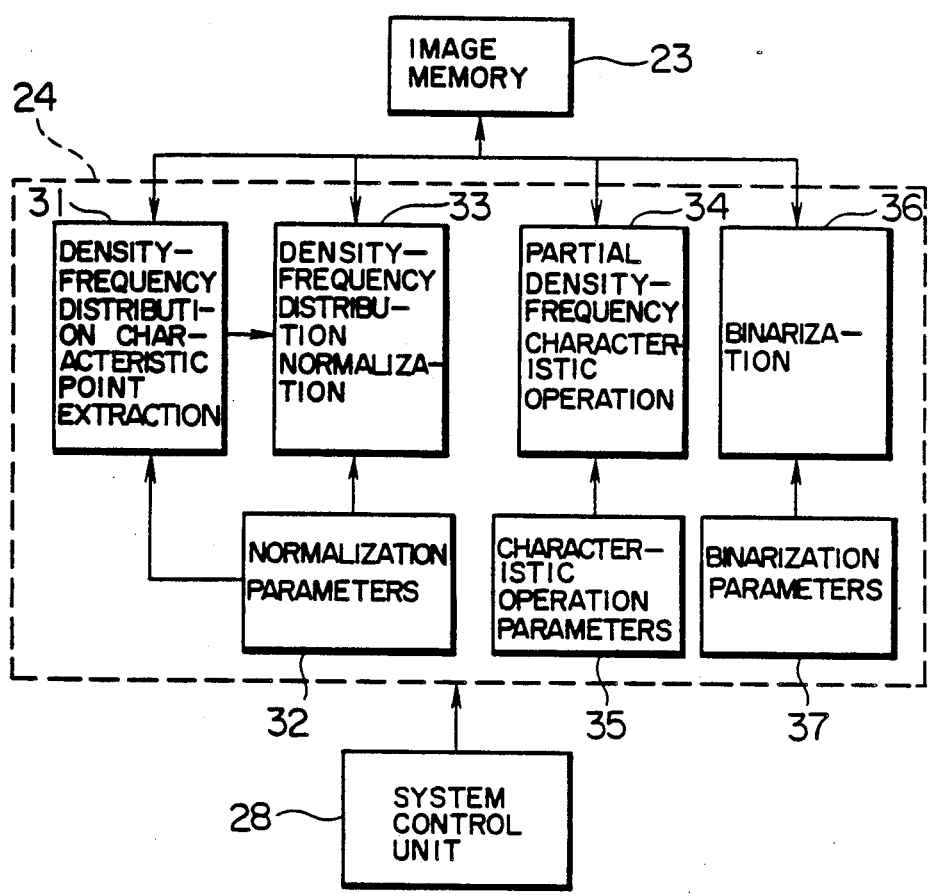
FIG. 3 shows an internal configuration of segmentation means, FIG. 4 explains an operation of the segmentation means, FIG. 5 explains an operation of the embodiment, FIGS. 6A and 6B explain an area designation method.

As shown in FIG. 3, segmentation means 24 extracts the object area from the information of the input image stored in the dither/binary image memory 23 under the control of the system control unit 28. The segmentation means 24 comprises a density-frequency distribution characteristic point extraction unit 31, for determining a density level at a characteristic point (for example, a peak for a maximum frequency) of the density-frequency distribution used in the density-frequency distribution normalization process, from the input image and reference image stored in the dither/binary image memory 23, a normalization parameter memory 32 which stores codes of the characteristic points to be determined by the density-frequency distribution characteristic point extraction unit 31 and the characteristic points extracted by the density-frequency distribution characteristic point extraction unit 31 in accordance with the codes of the characteristic points for the reference image, a density-frequency distribution normalization unit 33 for normalizing the density-frequency distribution of the input image which causes coincidence of the characteristic point determined for the input image by the density-frequency distribution characteristic point extraction unit 31 and the characteristic point of the reference image stored in the normalization parameter memory 32, a partial density characteristic operation unit 34 for performing the partial density characteristic operation to a new image outputted from the density-frequency distribution normalization unit 33, a characteristic operation parameter memory 35 which stores a code of a partial density characteristic operation (for example, code of average density) to be performed by the partial density characteristic operation unit 34, a binarization unit 36 for binarizing the new image outputted from the partial density characteristic operation unit 34, and a binarization parameter memory 37 which stores binarization codes and thresholds therefor to be used in the binarization unit 36.

Figure 4:
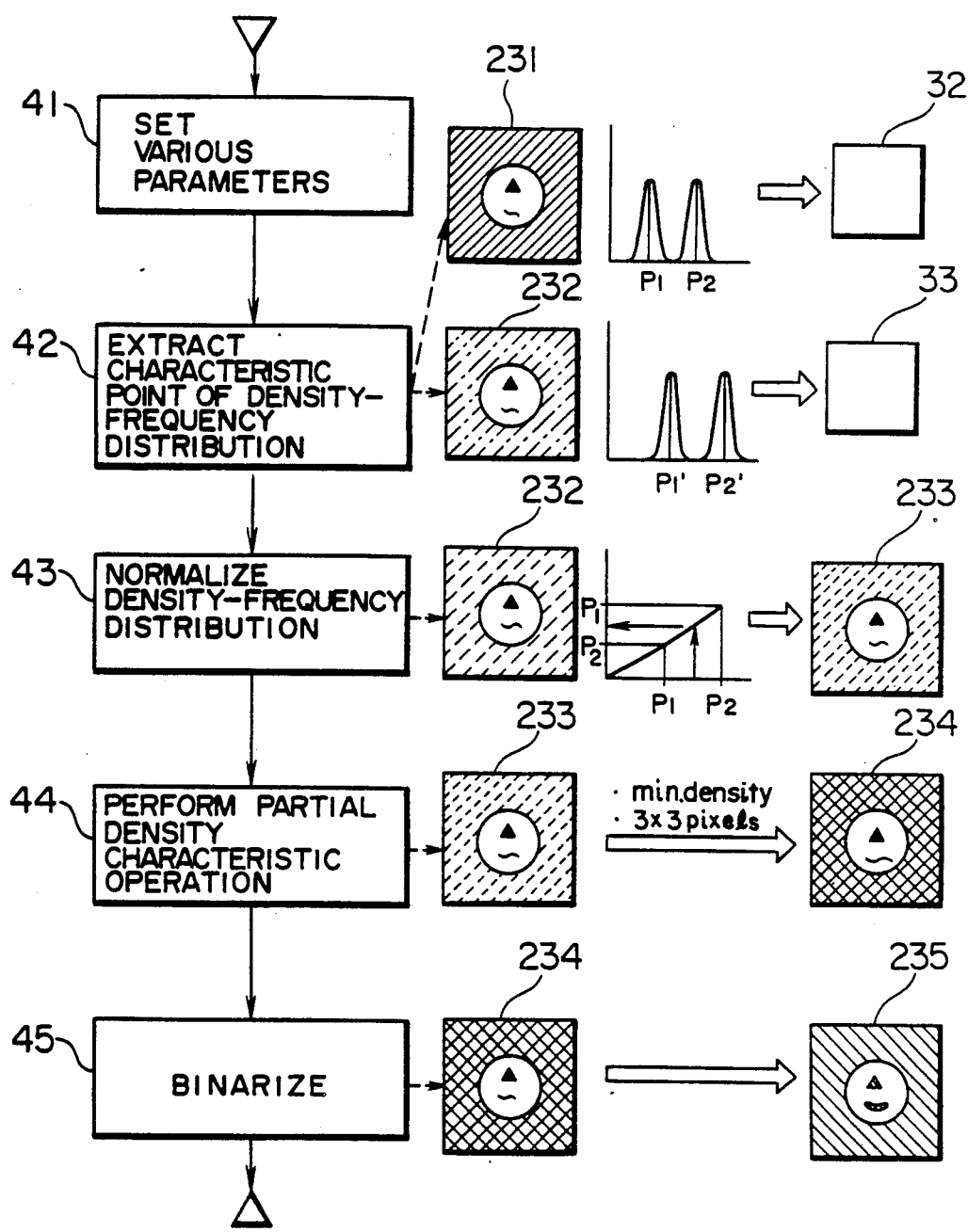

Referring to FIG. 4, the operation of the segmentation means 24 is explained.

In a step 41, conditions necessary for the segmentation means are set, that is, the code of the characteristic point to be extracted is set in the normalization parameter memory 32, the code of the partial density characteristic operation is set in the characteristic operation parameter memory 35, the code of the binarization is set in the binarization parameter memory 37, the reference image which is a reference for the density-frequency distribution normalization process is stored in a reference image memory 231 in the dither/binary image memory 23, and the object image is stored in an input image memory 232. Then the segmentation means 24 is started.

In a step 42, density levels (P1, P2) to the reference image in the reference image memory 231 are determined by the density-frequency distribution characteristic point extraction unit 31, the characteristic points are extracted in accordance with the codes of the characteristic codes stored in the normalization parameter memory 32 (for example, codes which indicate that two peaks having high frequencies of the peaks in a relatively wide range are supplied as the characteristic points), the density levels (P1, P2) thereof are stored in the normalization parameter memory 32 together with the codes of the characteristic points, the characteristic points for the input image in the input image memory 232 are extracted, and the density levels (P1', P2') thereof are transferred to the density-frequency distribution normalization unit 33.

In a step 43, the density-frequency distribution normalization unit 33 normalizes the density to cause the characteristic point of the input image in the input image memory 232 to be coincident with the characteristic point of the reference image, and stores the resulting image in a normalized image memory 233 in the dither/binary image memory 23. The density conversion by the density-frequency distribution normalization unit 33 linearly converts the density level P' of the input image to the new density level P in accordance with conversion lines represented by $$P = \frac{A}{P_1'} \cdot P' \ (0 \leq P' < P_1')$$

$$P = \frac{(P_2 - P_1)}{(P_2' - P_1')} \cdot (P' - P_1') + P_1 \ (P_1' \leq P' < P_2')$$

$$P = \frac{(N - P_2)}{(N - P_2')} \cdot (P' - P_2') + P_2 \ (P_2' \leq P')$$

wherein $P_1$ and $P_2$ are density levels of the characteristic points in the reference image, $P_1'$ and $P_2'$ are the characteristic points of the input image and N is a maximum number of gray levels, or effects a parallel shift represented by $$P = P' + (P_1 - P_1')$$

for the characteristic points $P_1$ and $P_1'$.

In a step 44, the partial density characteristic operation unit 34 performs the predetermined partial density characteristic operation to the normalized image memory 233 in accordance with the code of the partial density characteristic operation stored in the characteristic operation parameter memory 35 (for example, a code indicating filtering which stores a minimum density in a 3×3-pixel partial image at a center pixel thereof and repeats the operation for each pixel), and stores the result in the partial characteristic image memory 34 in the dither/binary image memory 23.

In a step 45, the binarization unit 36 binarizes the image in the partial characteristic image memory 234 by the binarization code (for example, a code indicating that those lower than a threshold T are "1" and others are "0") and the threshold stored in the binarization parameter memory 37, and stores the result in the binary image memory 235 in the dither/binary image memory 23. The operation of the segmentation means 24 has thus been described.

Referring to FIGS. 3–6, the operation of the overall image processing apparatus shown in FIG. 2 is explained.

As shown in FIG. 5, the operation of the image processing apparatus of the present embodiment is divided into two cycles, a density-frequency distribution normalization condition determination cycle comprising steps 51–54 and a partial density characteristic operation and binarization condition determination cycle comprising steps 55–57.

In the former density-frequency distribution normalization condition determination cycle, the operator picks up an object area to be used as the reference image by the television camera 21 in accordance with a message displayed on the console monitor 29 in the step 51 and designates read-in of the reference image through the keyboard 30. Thus, the object area is stored in the reference image memory 231 in the dither/binary image memory 23 as a multi-gray-level image through the signal converter 22 under the control of the system control unit 28. Then, the operator designates the object area and the background area shown in FIGS. 6A and 6B by stroking the screen of the area designation means 25 by the input medium while watching the object area displayed on the area designation means 25 in accordance with a message displayed on the console monitor 29.

Figure 6A:
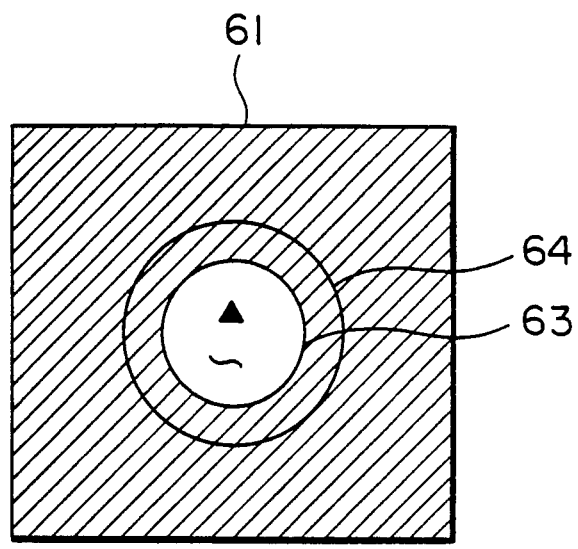
Figure 6B:
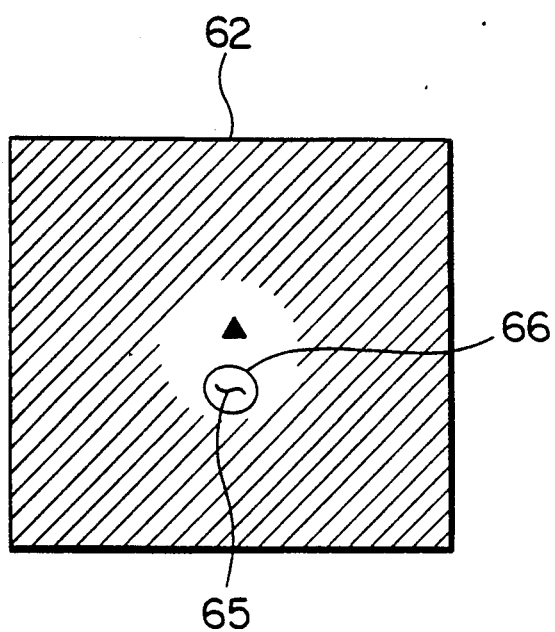

Two designation methods shown by a screen 61 of FIG. 6A and a screen 62 of FIG. 6B are provided to the operator. The screen 61 of FIG. 6A is used when the object area 63 and the background 64 to be designated are sufficiently large and simple. The object area 63 and the background 64 are designated by surrounding the areas. On the other hand, the screen 62 of FIG. 6B is used when the object area 65 and the background 66 to be designated are small or complex, and the areas are painted. If the characteristics of the density distributions of the object area and the background are very uniform, only portions of the areas may be designated.

After the designation of the areas of the operator, the system control unit 28 stores the object area and the background designated by the area designation means 25 and causes the density distribution normalization evaluation unit 26 to calculate the density-frequency distributions per unit area in the respective areas and stores them.

The density-frequency distribution per unit area means a frequency of the density-frequency distribution multiplied by a reciprocal of the area.

The density-frequency distributions per unit area of the object area and the background in the reference image are used to evaluate the normalization conditions.

In a step 52, the operator changes the illumination to the object area and the contrast of the object area and the background to those expected in an actual recognition in accordance with a message displayed on the console monitor 29, and again picks up an object area and enters a read-in command through the keyboard 30. Thus, the image of the object area is stored in the input image memory 232 in the dither/binary image memory 23 under the control of the system control unit 28. Then, the operator designates the object area and the background as he/she did in the step 51 by the area designation means 25 in accordance with the message displayed on the console monitor 29, and the designated areas (density-frequency distributions per unit area) are stored in the density distribution normalization evaluation unit 26.

In a step 53, the density distribution normalization evaluation unit 26 determines a currently optimum density-frequency distribution normalization condition, that is, an optimum characteristic point code such as a code representing a maximum, minimum or intermediate level of the density-frequency distribution, and stores it in the normalization parameter memory 32 of the segmentation means 24. Then, the system control unit 28 starts the segmentation means 24 and displays the content of the normalization image memory 233 in the dither/binary image memory 23 on the area designation means 25.

In a step 54, the operator decides whether to continue the process in accordance with the message displayed on the console monitor 29 and enters the decision through the keyboard 30. If it is to continue the process, the process returns to the step 52, and if it is not to continue the process, the density-frequency distribution normalization condition determination cycle ends and the process proceeds to the next step.

Figure 7:
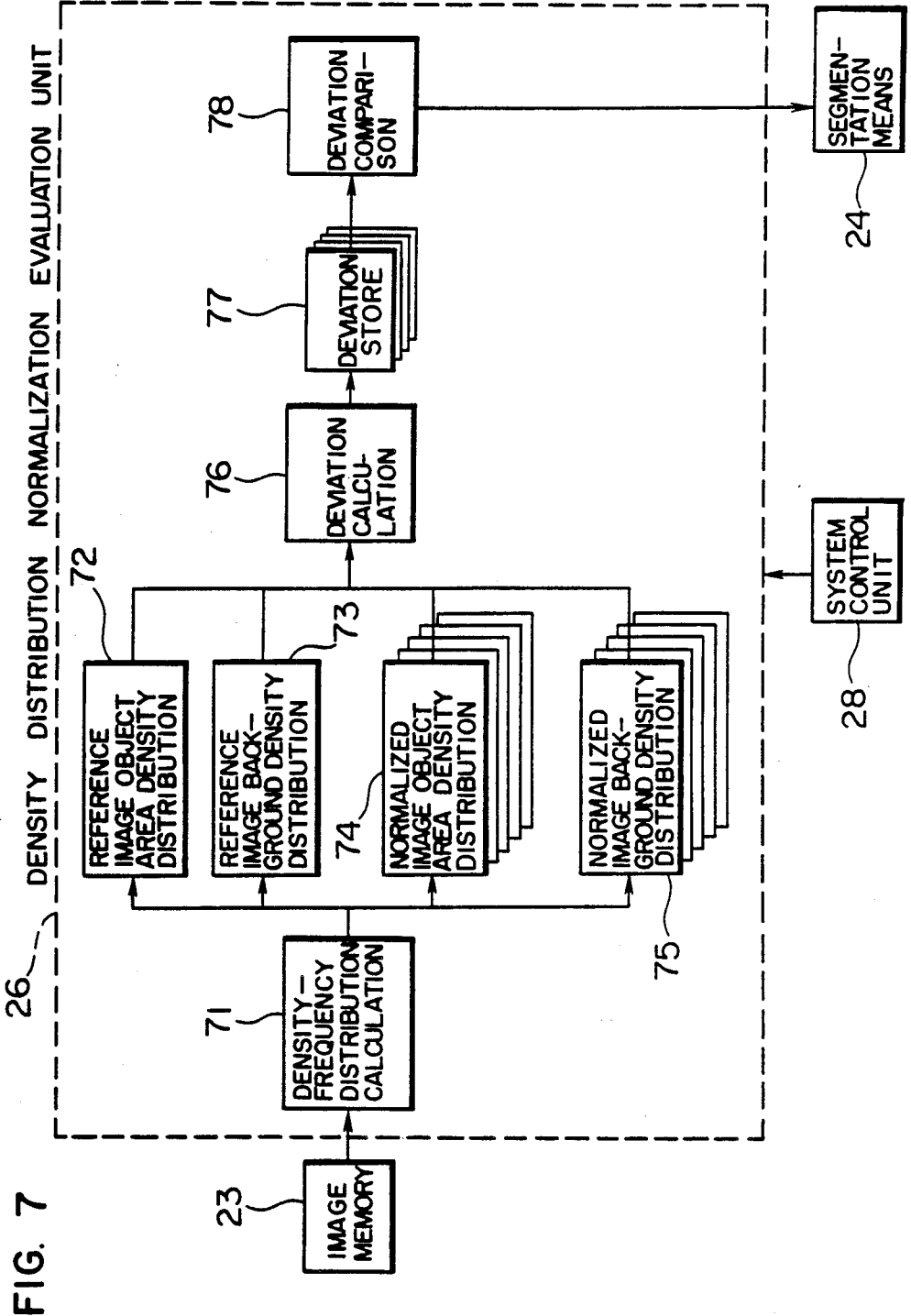
FIG. 7 shows an internal configuration of a density distribution normalization evaluation unit, FIG. 8 explains the operation of the density distribution normalization evaluation unit.
Figure 8:
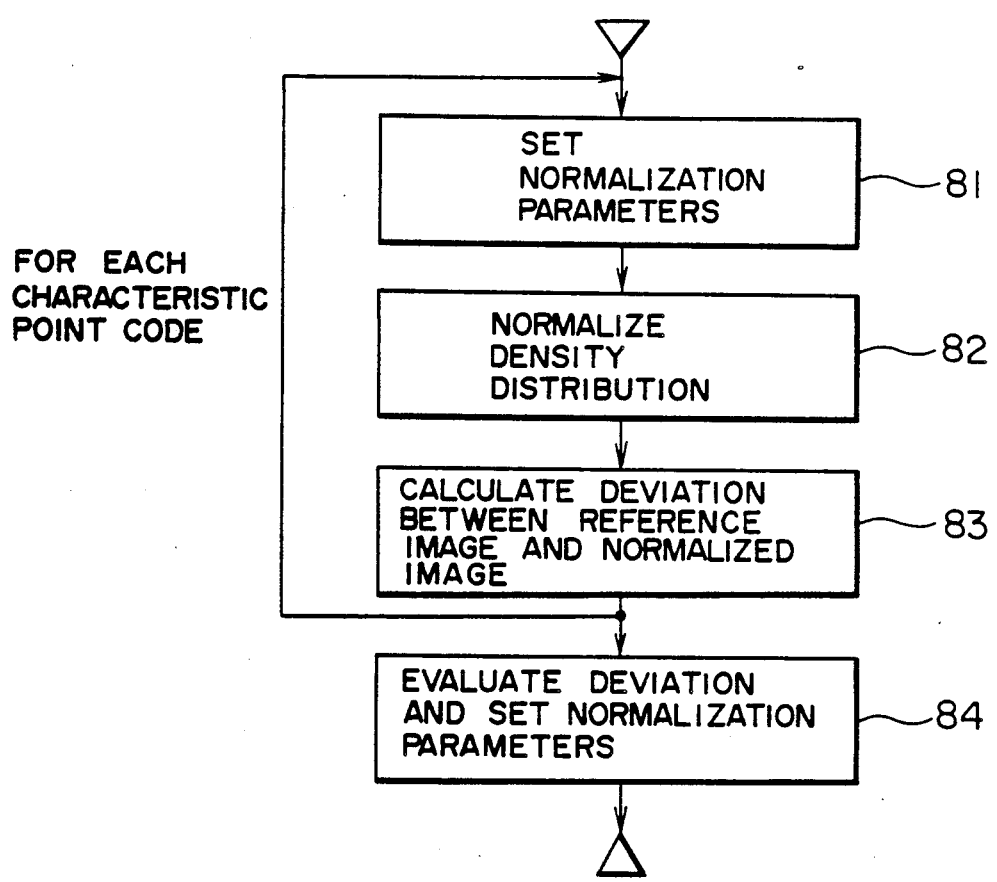

Referring to FIGS. 7 and 8, the internal configuration and operation of the density distribution normalization evaluation unit 26 are explained.

As shown in FIG. 7, the density distribution normalization evaluation unit 26 comprises a density-frequency distribution calculation unit 71 for calculating a density-frequency distribution per unit area of the image memory 231 or input image memory 232 in the dither/binary image memory 23 in the object area and the background stored in the system control unit 28, a reference image object area density distribution memory 72 which stores a density-frequency distribution per unit area of the object area in the reference image memory 231, a reference image background density distribution memory 73 which stores a density-frequency distribution per unit area of the background in the reference image memory 231, a normalized image object area density distribution memory 74 which stores a density-frequency distribution per unit area of the object area in the normalized image memory 233 normalized by a number of present characteristic point codes, a normalized image background density distribution memory 75 which stores a density-frequency distribution per unit area of the background in the normalized image memory 233 normalized by a number of preset characteristic point codes, a deviation calculation unit 76 for calculating deviations of the normalized image object code density distribution memory 74 and the normalized image background density distribution image 75 from the reference image object area density distribution memory 72 and the reference image background density distribution memory 73, respectively, a deviation memory 77 which stores deviations for the characteristic point codes calculated by the deviation calculation unit 76, and a deviation compare unit 78 for detecting a minimum deviation stored in the deviation memory 77 and storing the characteristic point code for the minimum deviation in the normalization parameter memory 32 of the segmentation means 24.

The operation is explained with reference to FIG. 8. When started by the step 51 of FIG. 5, the density-frequency distribution calculation unit 71 calculates the density-frequency distribution per unit area of the reference image memory 231 of the dither/binary image memory 23 in the object area and the background stored in the system control unit 28, and stores the results in the reference image object area density distribution memory 72 and the reference image background density distribution memory 73.

When started by the step 54 of FIG. 5, the system control unit 28 selects one of a number of preset characteristic point codes in a step 81, as shown in FIG. 8, and stores it in the normalization parameter memory 32 of the segmentation means 24. After the setting of the normalization parameter in the step 81, the process proceeds to a step 82.

In a step 82, the system control unit 28 starts the segmentation means 24 and then the density-frequency distribution calculation unit 71 of the density distribution normalization evaluation unit 26 calculates the density-frequency distribution per unit area of the normalized image memory 233 in the dither/binary image memory 23 of the object area and the background stored in the system control unit 28, and stores the results in the normalized image object area density distribution memory 74 and the normalized image background density distribution memory 75 corresponding to the characteristic point code.

In a step 83, deviations between the normalized image object area density distribution memory 74 and the normalized image background density distribution memory 75 corresponding to the characteristic point code, and the reference image object area density distribution memory 72 and the reference image background density distribution memory 73, respectively, are calculated and stores them in the deviation memory 77 as new deviations in addition to the deviations previously calculated.

The above operation is performed for each of the characteristic point codes under the control of the system control unit 28. In a step 84, the deviation compare unit 78 detects the minimum deviation and stores the characteristic point code corresponding to the minimum deviation in the normalization parameter memory 32 of the segmentation means 24.

The operation of the density distribution normalization evaluation unit 26 has thus been described.

Turning back to FIG. 5, the operation of the partial density characteristic operation and the binarization condition determination cycle are explained.

In a step 55, the operator picks up the object area as he/she did in the step 52 in accordance with the message displayed on the console monitor 29, reads in the image and designates the area as he/she did in the step 51.

In a step 56, the partial density characteristic evaluation unit 27 determines a currently optimum condition for the partial density characteristic operation, that is, optimum partial density characteristic point code, binary code and threshold, and stores them in the characteristic operation parameter memory 35 of the segmentation means 24 and the binarization parameter memory 37. The system control unit 28 then starts the segmentation means 24 and displays the binary image memory 235 in the dither/binary image memory 23 on the area designation means 25.

In a step 57, the operator decides whether to continue the process or not in accordance with the message displayed on the console monitor and enters the decision through the keyboard 30. If it is to continue the process, the process returns to the step 55, and if it is not to continue the process, the partial density characteristic operation and binarization condition determination cycle is terminated.

Figure 9:
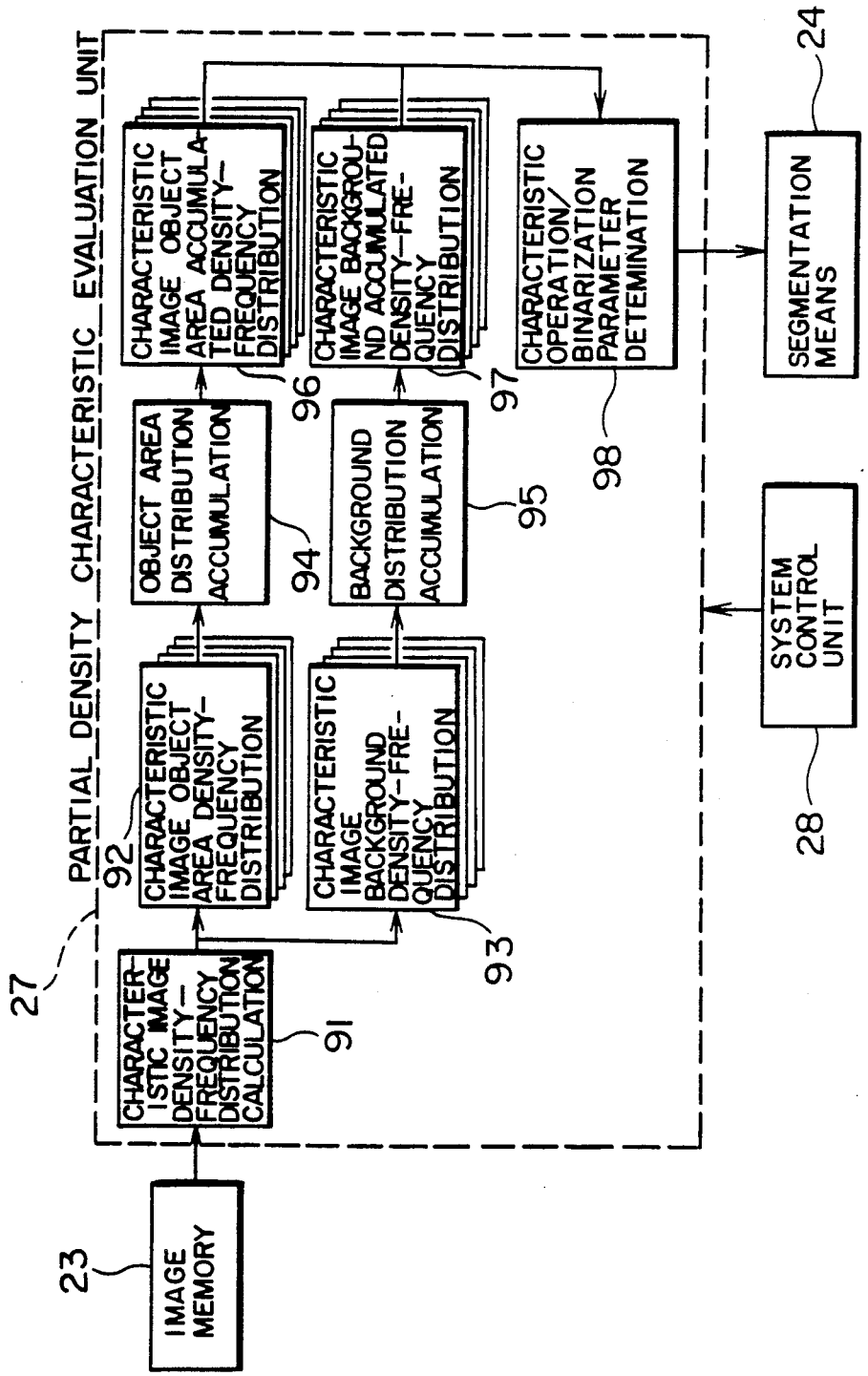
FIG. 9 shows an internal configuration of a partial density characteristic evaluation unit, FIG. 10 explains the operation of the partial density characteristic evaluation unit.
Figure 10:
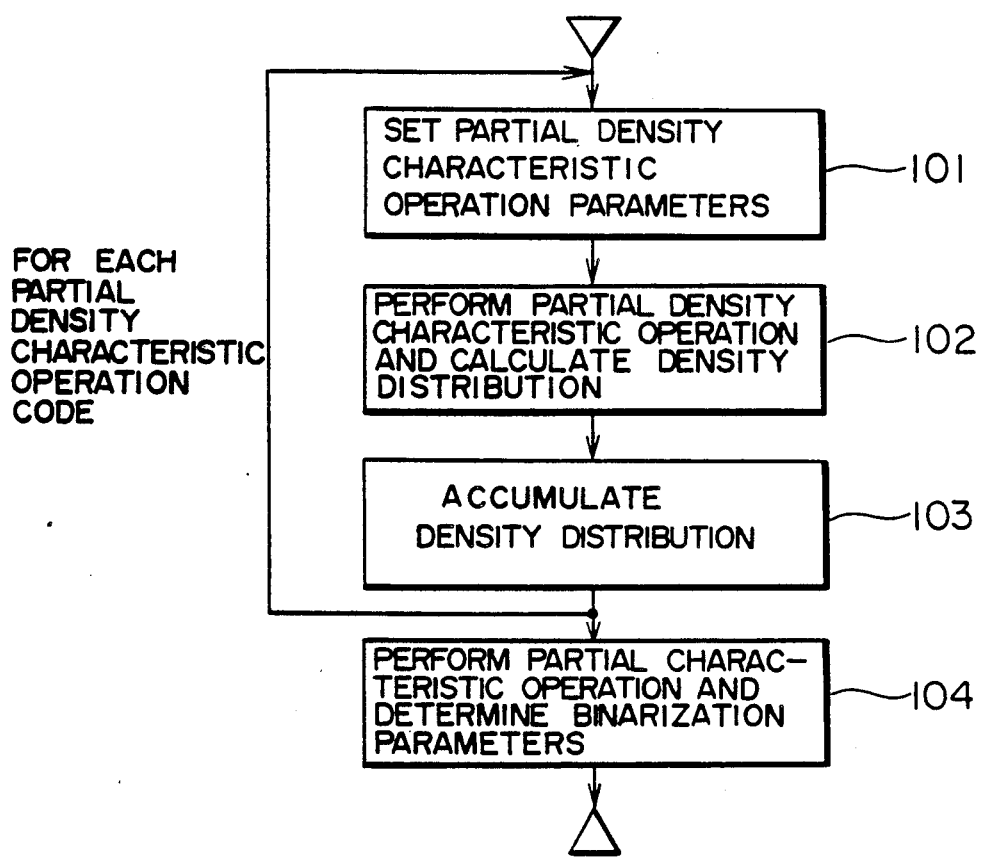

Referring to FIGS. 9 and 10, the internal configuration and the operation of the partial density characteristic evaluation unit 27 are explained.

The partial density characteristic evaluation unit 27 comprises a characteristic image density-frequency distribution calculation unit 91 for calculating the density-frequency distribution per unit area of the object area and the background for the partial characteristic image memory 234 which stores the result of the partial density characteristic operation by a number of preset partial density characteristic point codes, a characteristic image object area density frequency distribution memory 92 and a characteristic image background density-frequency distribution memory 93 which store the density-frequency distributions per unit area of the object area and the background, respectively, calculated by the characteristic image density-frequency distribution calculation unit 91, for each of the partial density characteristic codes, an object area distribution accumulation unit 94 and a background distribution accumulation unit 95 for accumulating the characteristic image object area density-frequency distribution memory 92 and the characteristic image background density-frequency distribution memory 93, respectively, for each designation, a characteristic image object area accumulated density-frequency distribution memory 96 and a characteristic image background accumulated density-frequency distribution memory 97 which store the density-frequency distributions corresponding to the partial characteristic codes, accumulated by the object area distribution accumulation unit 94 and the background distribution accumulation unit 95, respectively, and a characteristic operation/binarization parameter determination unit 98 which selects optimum partial density characteristic point code, binarization code and threshold from the characteristic image object area accumulated density-frequency distribution memory 96 and the characteristic image background accumulated density-frequency distribution memory 97 and stores them in the characteristic operation parameter memory 35 of the segmentation means 24 and the binarization parameter memory 37.

The operation is explained with reference to FIG. 10.

In a step 101, the system control unit 28 stores one of a number of present partial density characteristic operation codes in the characteristic operation parameter memory 32 of the segmentation means 24.

In a step 102, the segmentation means 24 is started by the system control unit 28 and the characteristic image density-frequency distribution calculation unit 91 of the partial density characteristic evaluation unit 27 calculates the density-frequency distributions per unit area of the partial characteristic image memory 234 in the dither/binary image memory 23 in the object area and the background stored in the system control unit 28, and stores them in the characteristic image object area density-frequency distribution memory 92 and the characteristic image background density-frequency distribution memory 93, respectively, corresponding to the partial density characteristic operation code.

In a step 103, the characteristic image object area density-frequency distribution memory 92 and the characteristic image background density-frequency distribution memory 93 corresponding to the partial density characteristic operation code are added to the characteristic image object area accumulated density-frequency distribution memory 96 and the characteristic image background accumulated density-frequency distribution memory 97, respectively, by the object area distribution accumulation unit 94 and the background distribution accumulation unit 95, respectively.

The above operation is repeated for each of the partial density characteristic operation codes. Then, in a step 104, optimum partial density characteristic operation code and binarization code are selected from the characteristic image object area accumulated density-frequency distribution memory 96 and the characteristic image background accumulated density-frequency distribution memory 97 by using a known method to be referred in FIGS. 13 and 14, and they are stored in the characteristic operation parameter memory 35 and the binarization parameter memory 37 of the segmentation means 24.

Referring to FIGS. 11 to 14, the internal configuration and the operation of the characteristic operation/binarization parameter determination unit 98 are explained.

Figure 11:
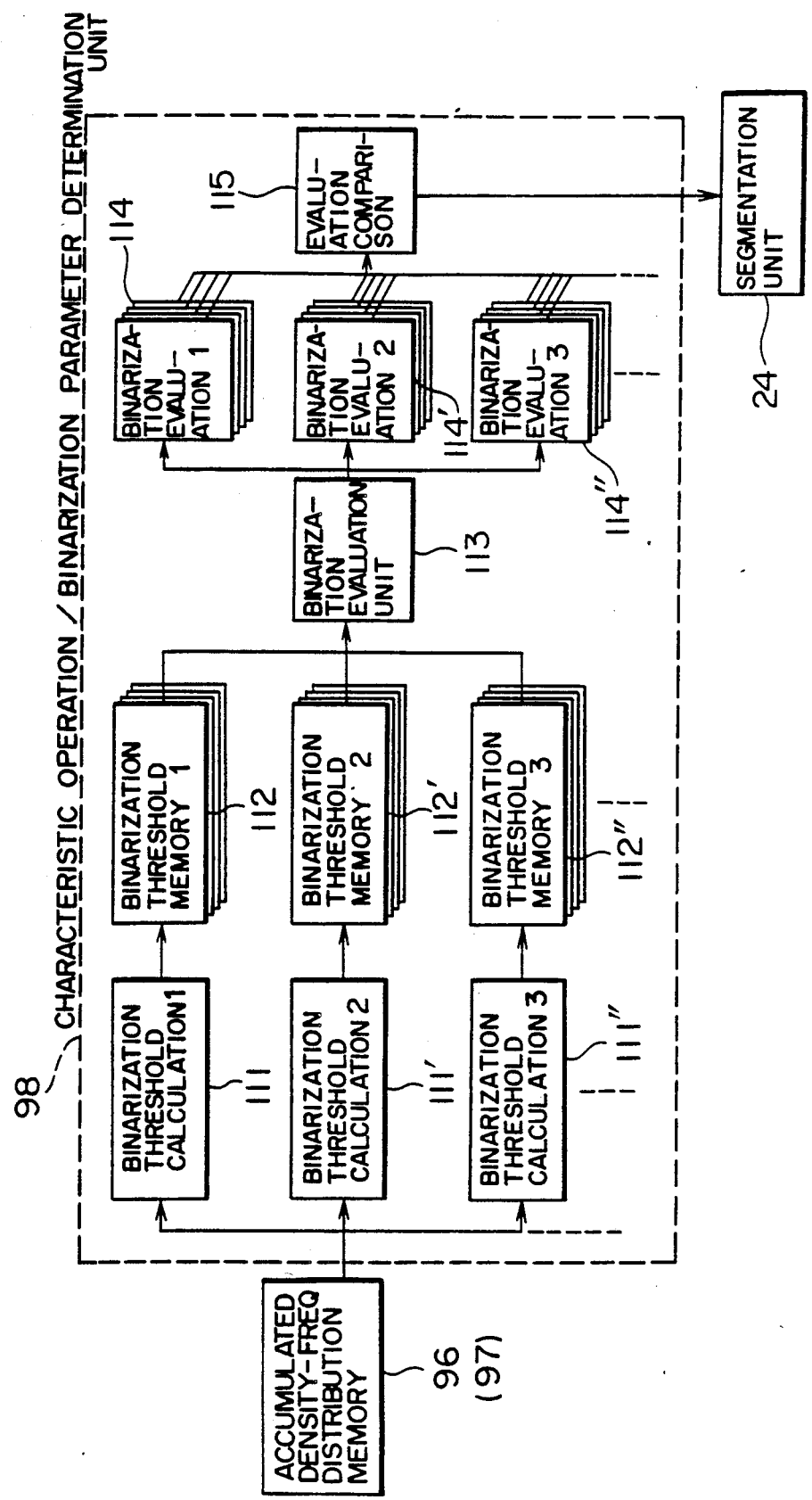
FIG. 11 shows an internal configuration of a characteristic operation/binarization parameter determination unit.

As shown in FIG. 11, the characteristic operation/binarization parameter determination unit 98 comprises a binarization threshold calculation unit 111 for calculating binarization thresholds for the characteristic image object area accumulated density-frequency distribution memory 96 and the characteristic image background accumulated density-frequency distribution memory 97 corresponding to the partial density characteristic operation code (a plurality of binarization threshold calculation units 111, 111' and 111" of different threshold calculation methods are provided), a binarization threshold memory 112 which stores the threshold corresponding to the partial density characteristic operation code calculated by the binarization threshold calculation unit 111 (binarization threshold memories 112' and 112" are provided for the binarization threshold calculation units 111' and 111", respectively), a binarization evaluation unit 113 for evaluating the binarization based on the binarization threshold 112 corresponding to the partial density characteristic operation code, and the characteristic image object area accumulated density-frequency distribution memory 96 and the characteristic image background accumulated density-frequency distribution memory 97, a binarization evaluation memory 114 which stores the binarization evaluation corresponding to the partial density characteristic operation code calculated by the binarization evaluation unit 113 (binarization evaluation memories 114' and 114" are provided for the binarization threshold calculation units 111' and 111", respectively), and an evaluation compare unit 115 for detecting a maximum evaluation value of the binarization evaluation memories 114, 114' and 114" and storing the code of the binarization threshold calculation unit corresponding to the maximum evaluation value, the threshold and the partial density characteristic operation code in a predetermined parameter memory of the segmentation means 24.

Figure 12:
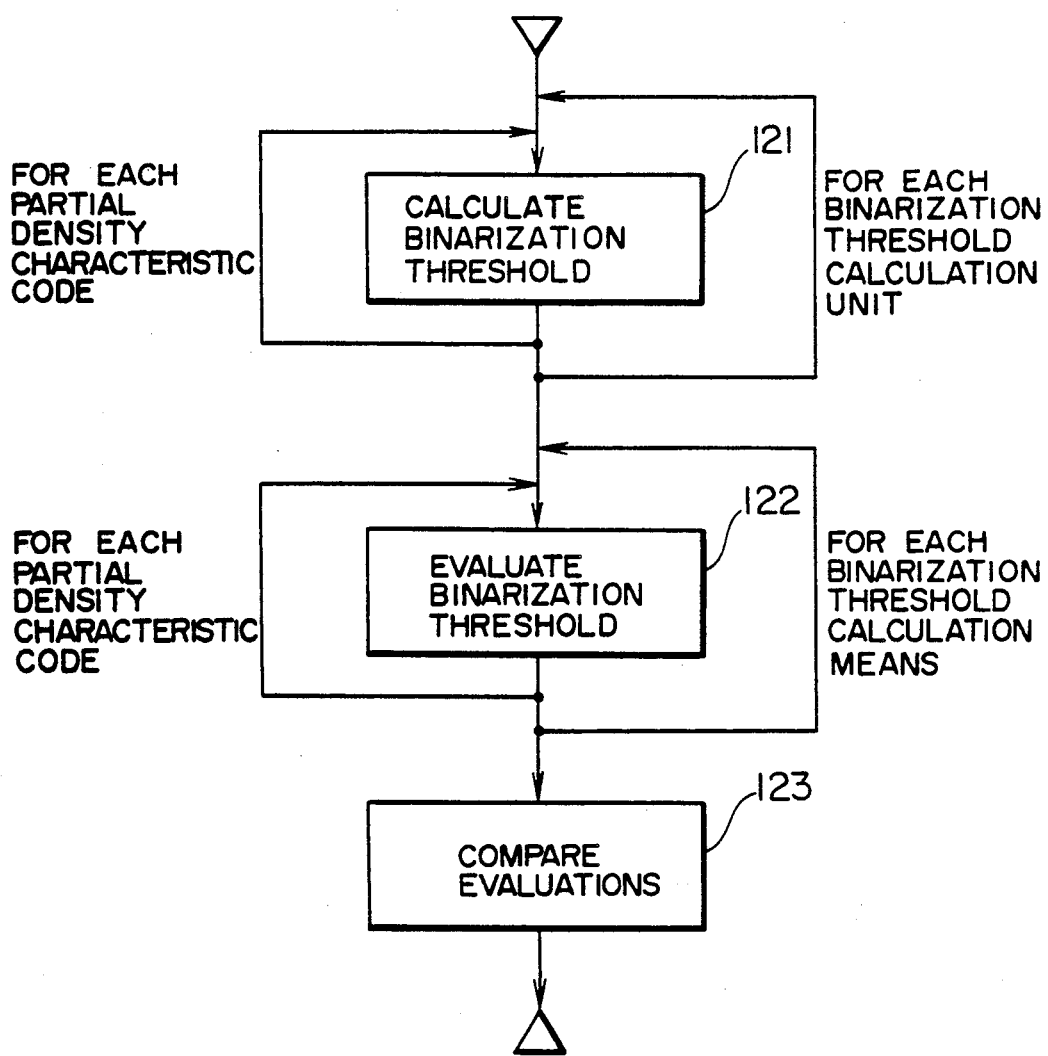
FIG. 12 shows a flow chart for explaining the operation of the characteristic operation/binarization parameter determination unit, FIGS. 13A-13C explain a method for calculating a binarization threshold, FIGS. 14A and 14B explain a method for calculating a binarization threshold evaluation.

The operation is explained with reference to FIG. 12.

In a step 121, the binarization threshold calculation unit 111, 111' and 111" calculate the thresholds in different methods based on the characteristic image object area accumulated density-frequency distribution memory 96 and the characteristic image background accumulated density-frequency distribution memory 97 for the partial density characteristic code, and store them in the binarization threshold memories 112, 112' and 112", respectively.

Figure 13A:
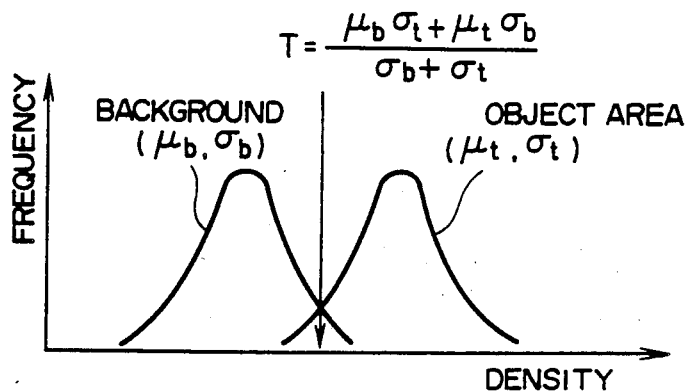
Figure 13B:
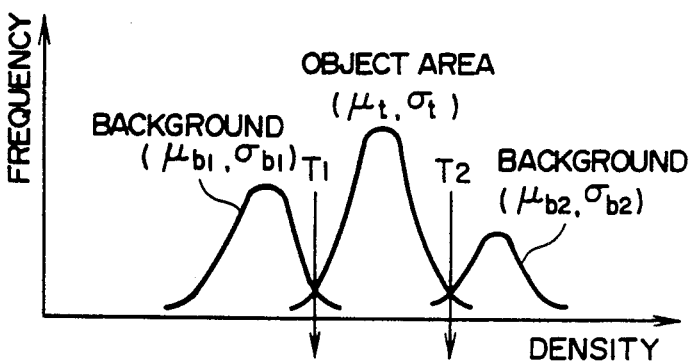
Figure 13C:
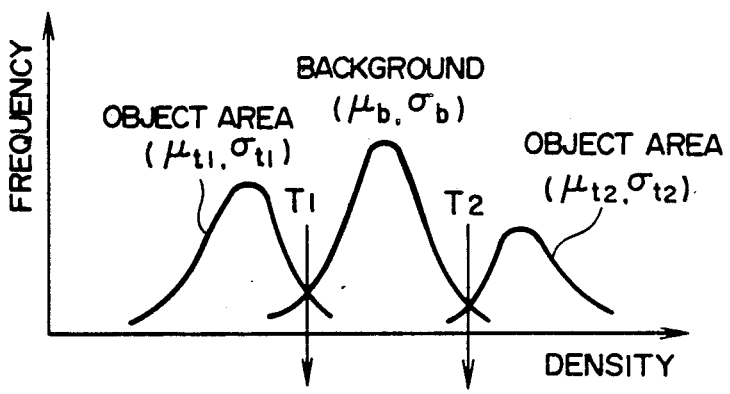

The binarization threshold calculation unit 111, 111' and 111" calculate the binarization thresholds in the methods shown in FIGS. 13A, 13B and 13C, respectively.

In the method of FIG. 13A, a threshold T is set at a center of distribution.

$$T = \frac{\mu_b \sigma_t + \mu_t \sigma_b}{\sigma_b + \sigma_t}$$

where $(\mu_t, \sigma_t)$ and $(\mu_b, \sigma_b)$ are average values and deviations of the object area and background accumulated density-frequency distribution memories 96 and 97, respectively.

In the method of FIG. 13B, an average value and a deviation of a portion of the background accumulated density-frequency distribution which is on the left of an average value $\mu_t$ (smaller than the average value $\mu_t$) of the object area accumulated density-frequency distribution memory 96 are represented by $(\mu_{b1}, \sigma_{b1})$, and an average value and a deviation of a portion of the background accumulated density-frequency distribution which is on the right of the average value $\mu_t$ are represented by $(\mu_{b2}, \sigma_{b2})$, and the densities between a center T1 of $(\mu_t, \sigma_t)$ and $(\mu_{b1}, \sigma_{b1})$ and a center T2 of $(\mu_t, \sigma_t)$ and $(\mu_{b2}, \sigma_{b2})$ are binarized.

In the method of FIG. 13C, a distribution ($\mu_{t1}$, $\sigma_{t1}$) of a portion of the object area which is on the left of an average value of a background distribution ($\mu_b$, $\sigma_b$) and a distribution ($\mu_{t2}$, $\sigma_{t2}$) of a portion of the object area which is on the right of the average value of the background distribution are determined, thresholds T1 and T2 are similarly determined, and the densities which are smaller than T1 or larger than T2 are binarized.

In a step 122 the binarization evaluation unit 113 evaluates the binarization thresholds 112, 112′ and 112″ for the partial density characteristic operation code and stores the evaluations in the binarization evaluation memories 114, 114′ and 114″.

Figure 14A:
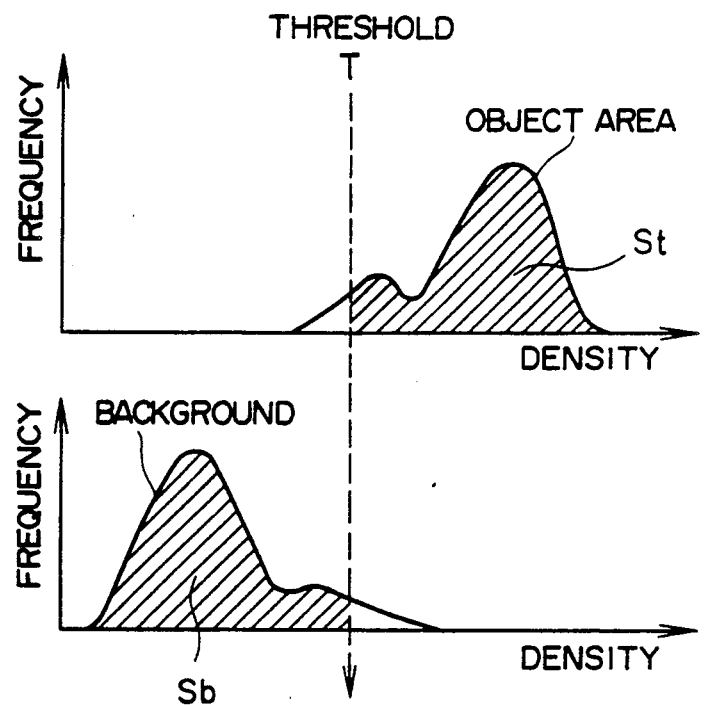

As shown in FIG. 14A, the evaluation is represented by a sum of an integration St (hatched area) which is a portion binarized as the object area when the characteristic image object area accumulated density-frequency distribution memory 96 is divided by the calculated threshold, and an integration Sb (hatched area) which is a portion not binarized when the characteristic image background accumulated density-frequency distribution memory 97 is divided by the calculated threshold. The larger the sum is, the better are the object area and the background binarized.

Figure 14B:
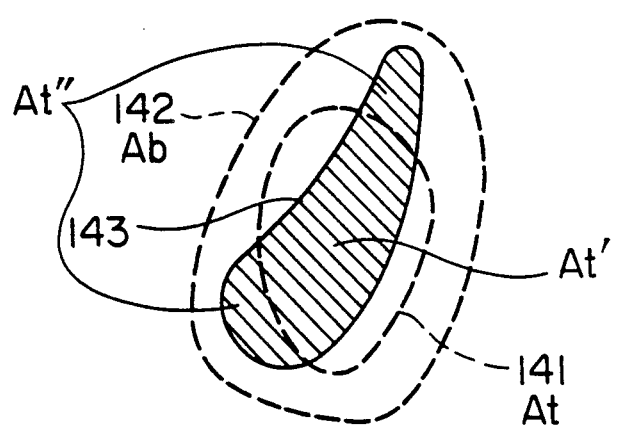

In FIG. 14B, numeral 141 denotes the object area designated by the operator, numeral 142 denotes the background area and numeral 143 denotes a binary pattern binarized under a certain condition. A ratio At′/At of an area At′ of the binary pattern 143 contained in the area 1412 and an area At of the area 141 is calculated, and a ratio (Ab-At″)/Ab of a difference(Ab-At″) between an area Ab which is outside of the area 141 and within the area 142 and an area at″ of the binary pattern 143 contained in the area Ab, and the area Ab, and a sum At′/At+(Ab-At″)/Ab is accumulated for each designation. The accumulation is equal to St+Sb in FIG. 14A. The above method is disclosed in U.S. Ser. No. 687,757 filed on Dec. 31, 1984 and assigned to the present assignee (corresponding to Japanese Patent Application Nos. 58-248151 and 58-248152).

turning back to FIG. 12, in a step 123, the evaluation compare unit 115 detects the maximum one of the binarization evaluations 114, 114′ and 114″ corresponding to the partial density characteristic operation code, and supplies the partial density characteristic operation code corresponding to the maximum evaluation, the code corresponding to the binarization threshold calculation unit and the threshold to the segmentation means 24.

The embodiment of the present invention has thus been described. In the segmentation, the area designation means is provided to limit the image information so that the operator (user) can easily set the condition of segmentation of the object area and the background.

In the present embodiment, the above condition, that is, the characteristic point code for the normalization, the partial density characteristic code and the binarization code are selected from the preset codes and are set into the segmentation means. Alternatively, those codes may be given priority and the user may operate the codes in the sequence of priority.

An application of the present invention is explained with reference to FIGS. 15 to 20.

An overall configuration of the present embodiment is shown in FIG. 15. The present image processing expert system comprises a knowledge base 221 which stores a plurality of sets of image characteristics and image processing procedures, deduction means 226 for deducting a procedure 222 for extracting an object area, selecting an evaluation procedure 224 for a predetermined image characteristic from image characteristic evaluation procedure group 223 and selecting a message 225 representing the predetermined image characteristic from the knowledge base 221, image characteristic evaluation means 227 for evaluating the image characteristic in accordance with the image characteristic evaluation procedure 224 and returning the evaluation result to the deduction means 226, inquiry means 228 for inquiring to the user in a message form in accordance with the content of a message 225 and returning the result to the deduction means 226, area designation means 229 by which a user 230 designates an area of an input image for the input image, and an image memory 210 which stores the input image and a binary image resulted from the area extraction. The inquiry means 228 usually comprises a CRT display and an operator console such as a keyboard, and the area designation means 229 may be a coordinate input medium (pointing device) such as digitizer, mouse, track ball or light pen. Those input/output devices are not restrictive but many modifications of the man-machine interfaces such as inquiry means 228 and the area designation means 229 may be used so long as they permit interactive inquiry by the user 230 and area designation to the input image.

Figure 16:
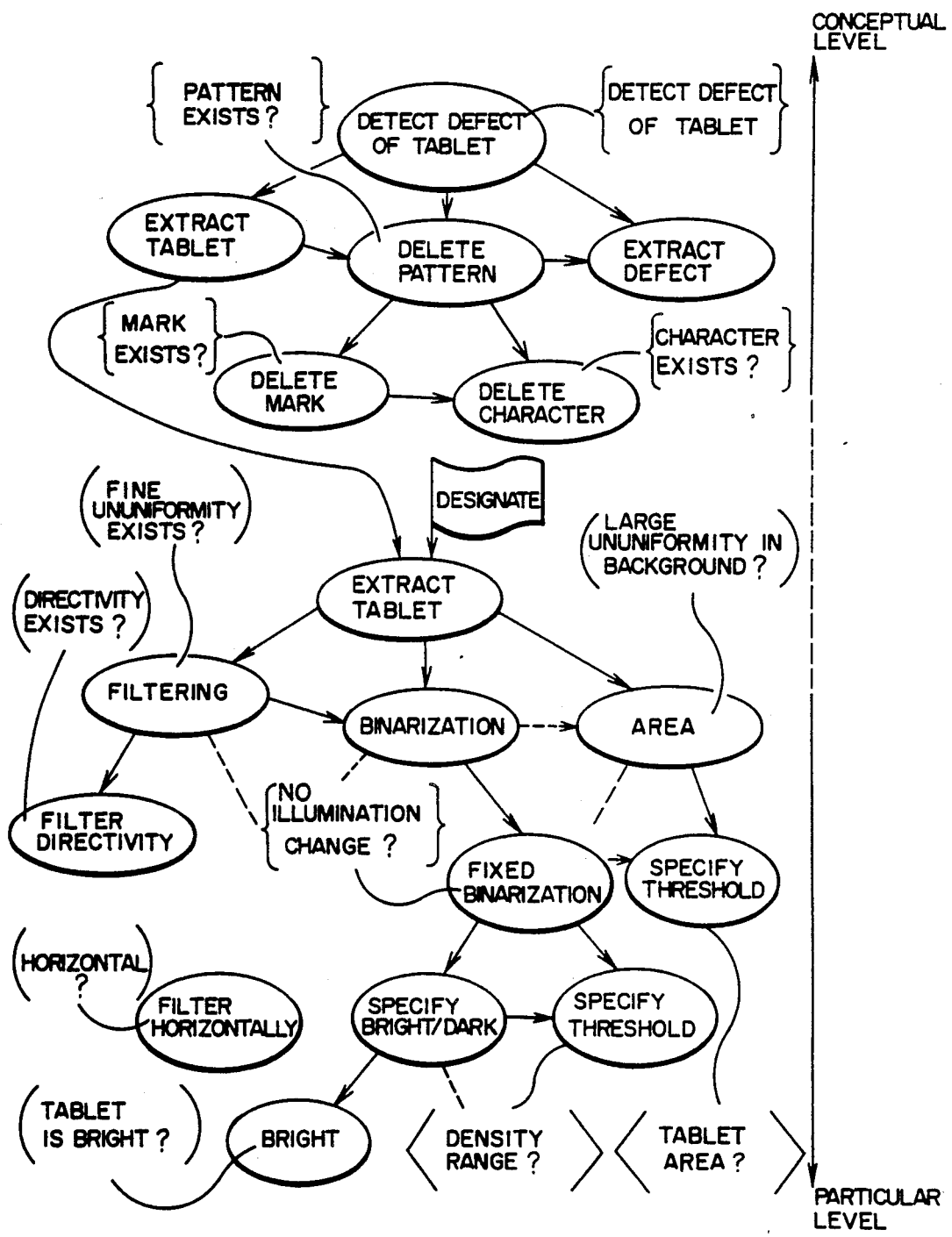
FIG. 16 shows an example of a knowledge or intelligence base of image processing in the embodiment of FIG. 15, FIGS. 17 and 18 show an operation flow chart of deduction means in the embodiment of FIG. 15.

Referring to FIG. 16, a configuration of the knowledge base is explained, and then an operation of the overall system is explained with reference to FIG. 17.

FIG. 16 shows the configuration of the knowledge base used in the image processing expert system of the present invention. A defect detection of a tablet is explained here. Image processing modules used in the application are defined between a conceptual level and a particular level, and a sequence of execution of those modules is also defined as much as possible.

The sequence of execution is shown by a lateral arrow from one module to another. Each module has a production rule conditioned by the image characteristic to define the image characteristic under which the module is to be used. The image characteristic which is a condition part of the production rule may inquire to the user 230 in message form by the inquiry means 228 or internally evaluate by the image characteristic evaluation means 227. The evaluation of the image characteristic represented by { } is a condition evaluated by the inquiry means 228, the evaluation of the image characteristic represented by ( ) is a condition evaluated by the image characteristic evaluation means 227. The evaluation of the image characteristic represented by < > is not the condition part of the production rule and indicates that the evaluation of the image characteristic which calculates a predetermined numeric parameter based on the image characteristic is defined in this module.

The evaluation of the image characteristic as the condition part of the production rule is hereinafter called "image observation", and the evaluation of the image characteristic which calculates the numeric parameter based on the image characteristic is called "parameter calculation".

The module marked with "designated" indicates that when it is decided to be used after the evaluation of the rule, the area designation means 229 is to be started to designate the element of the image corresponding to that module.

There is no definite boundary between the conceptual level and the particular level of the knowledge base. The conceptual level is shared by only a small number of applications, and the particular level is shared by a large number of applications. The conceptual level of knowledge is independent from the function of particular image processing and relates only to the image characteristic, and the particular level of knowledge has connection with a function of particular image processing as well as hardware function and construction.

Figure 17:
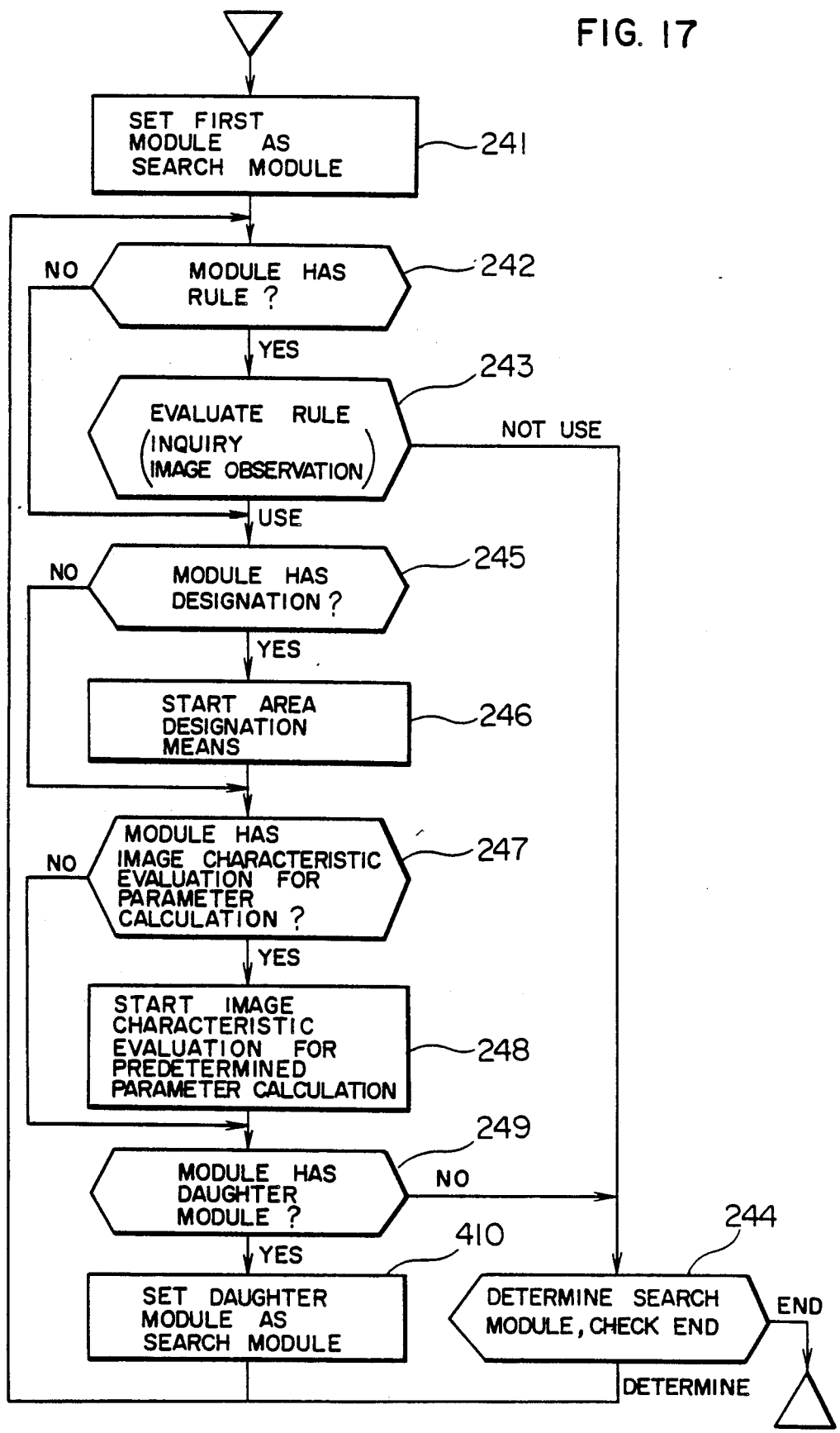
Figure 18:
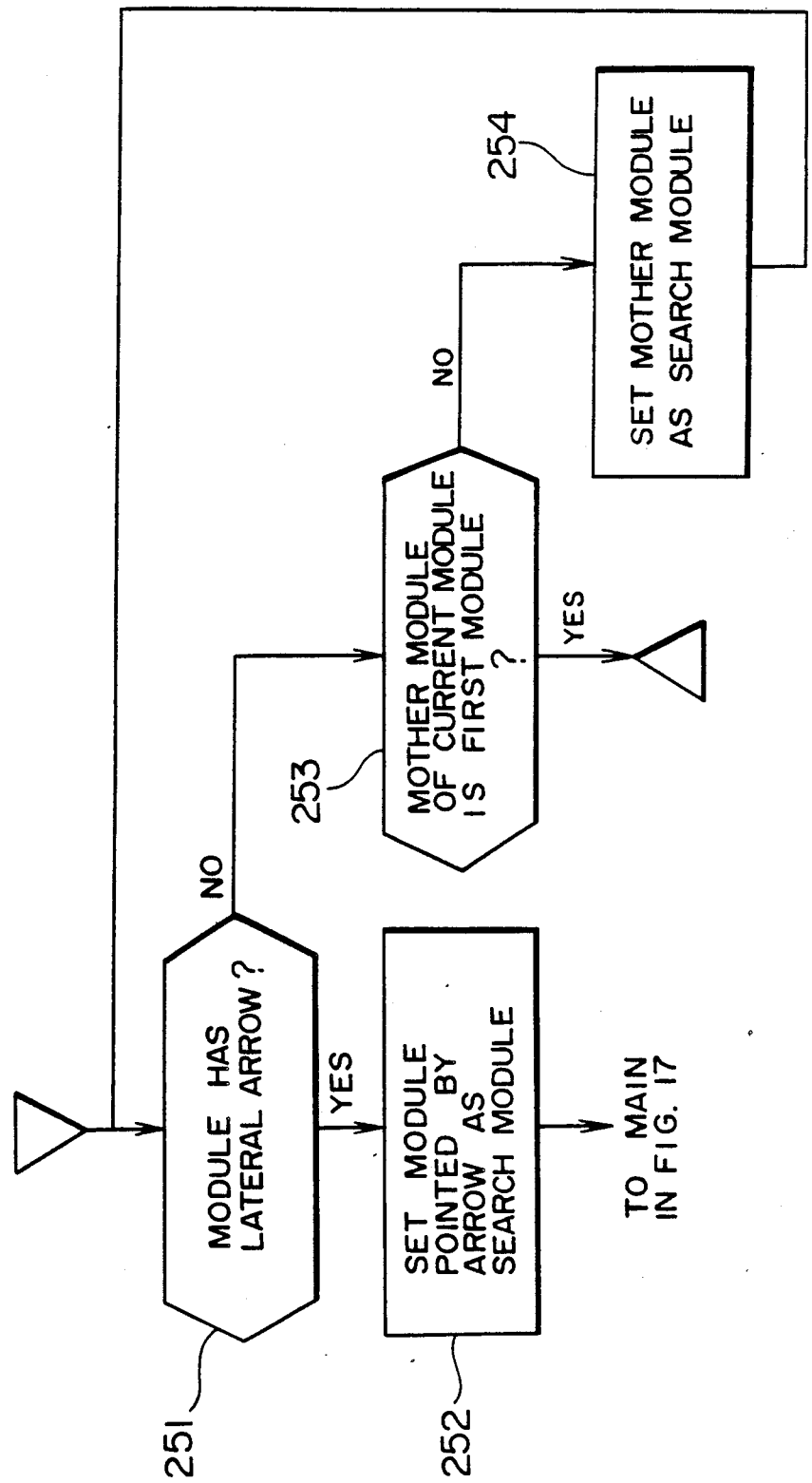

Referring to FIGS. 17 and 18, the operation of the deduction means 226 and the overall system is explained.

The operation of the deduction means 226 is basically to vertically search the modules of the knowledge base shown in FIG. 16. In a step 241 of FIG. 17, the first module is selected as a module to be searched. In a step 242, whether the module has the production rule or not is checked. If it has, the process proceeds to a step 243, and if it does not have, the process goes to a step 245. In a step 243, the production rule of the module is evaluated and whether the module is to be used or not is checked. The condition part of the production rule was explained in FIG. 6. If the inquiry to the user in the form of the message has been defined, the message 225 is delivered to the inquiry means 228. The inquiry means 228 shows the message to the user and the user checks if the image characteristic described in the message is equal to the image characteristic of the user application. The result is sent back to the deduction means 226. On the other hand, if the image observation has been defined as the condition, the image characteristic evaluation procedure 224 corresponding to the image observation is selected from the image characteristic evaluation procedure group 223 and it is supplied to the image characteristic evaluation means 227. The image characteristic evaluation means 227 evaluates the image characteristic in accordance with the characteristic evaluation procedure 224 based on the area pattern data supplied to area designation means 229 and the input image to the image memory 210, and sends the evaluation result back to the deduction means 226. The deduction means 226 repeats the above operation several times to evaluate the production rule of the module.

If it is determined to use the module, the process goes to a step 245, and if not, the process goes to a step 244. In the step 245, whether the module has a designated area or not is checked, and if it has, the process goes to a step 246 and if it does not have, the process goes to a step 247. In the step 246, if the module is the tablet extraction module of FIG. 16, the user is requested to designate the area of tablet and the area designation means 229 is started. In a step 247, whether the module has the image characteristic evaluation for the parameter calculation shown in FIG. 16 or not, and if it has, the process goes to a step 248, and if it does not have, the process goes to a step 249. In the step 248, the parameter calculation procedure 224 defined for the module is selected from the image characteristic evaluation procedure group 223 and it is supplied to the image evaluation means 227. The image evaluation means 227 calculates the parameter in accordance with the procedure 224 and sends the result back to the deduction means 226. The deduction means stores it. When all parameters of the module corresponding to the particular image processing function have been decided, the deduction means 226 edits the area extraction procedure 224 for the module and sends it to the image characteristic evaluation means 227 for execution (as will be described later, the image characteristic evaluation means 227 may also operate as area extraction means.)

In the step 249, whether the module has a daughter module or not is checked, and if it has, the process goes to a step 410, and if it does not have, the process goes to a step 244. In the step 410, the first daughter module is set as the search module and the process returns to the step 242. In the step 244, the end of the overall operation is checked and the module to be next searched is determined.

As shown in FIG. 18, in a step 251, whether the module has a lateral arrow as shown in FIG. 16, that is, a sister module having a sequence of execution defined or not is checked, and if it has, the process goes to a step 252, and if it does not have, the process goes to a step 253. In the step 252, the module pointed by the arrow is set as the search module and the process goes to FIG. 17. In the step 253, whether the mother module of the current module is the first module of the knowledge base or not is checked, and if it is the first module, the process ends and the area extraction procedure can be edited by tracing the modules determined to be used. On the other hand, if the mother module of the current module is not the first module, the mother module is set as the search module in the step 254 and the process returns to the step 251.

Figure 19:
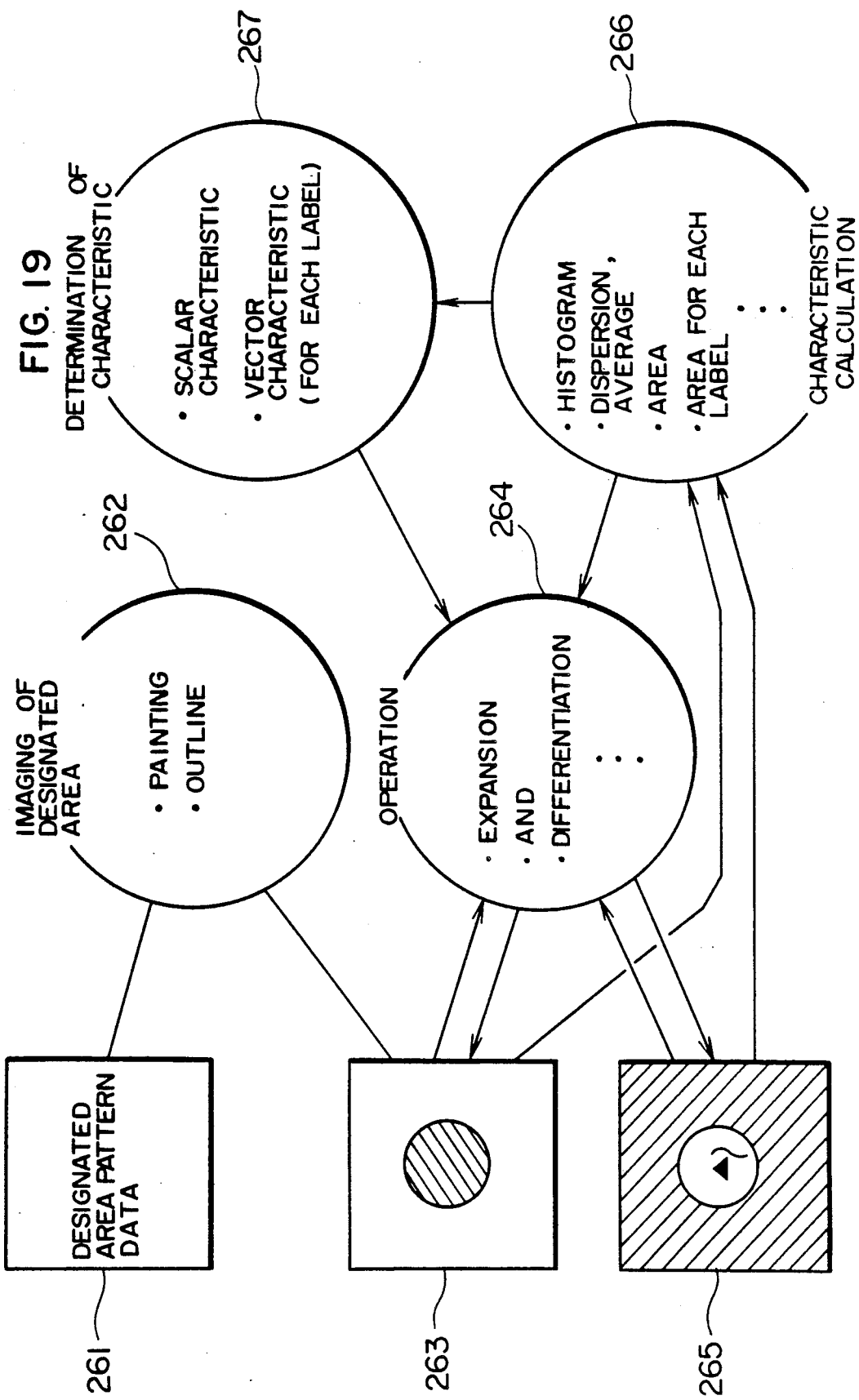
FIG. 19 shows an internal functional configuration of image characteristic evaluation means in the embodiment of FIG. 15.
Figure 20:
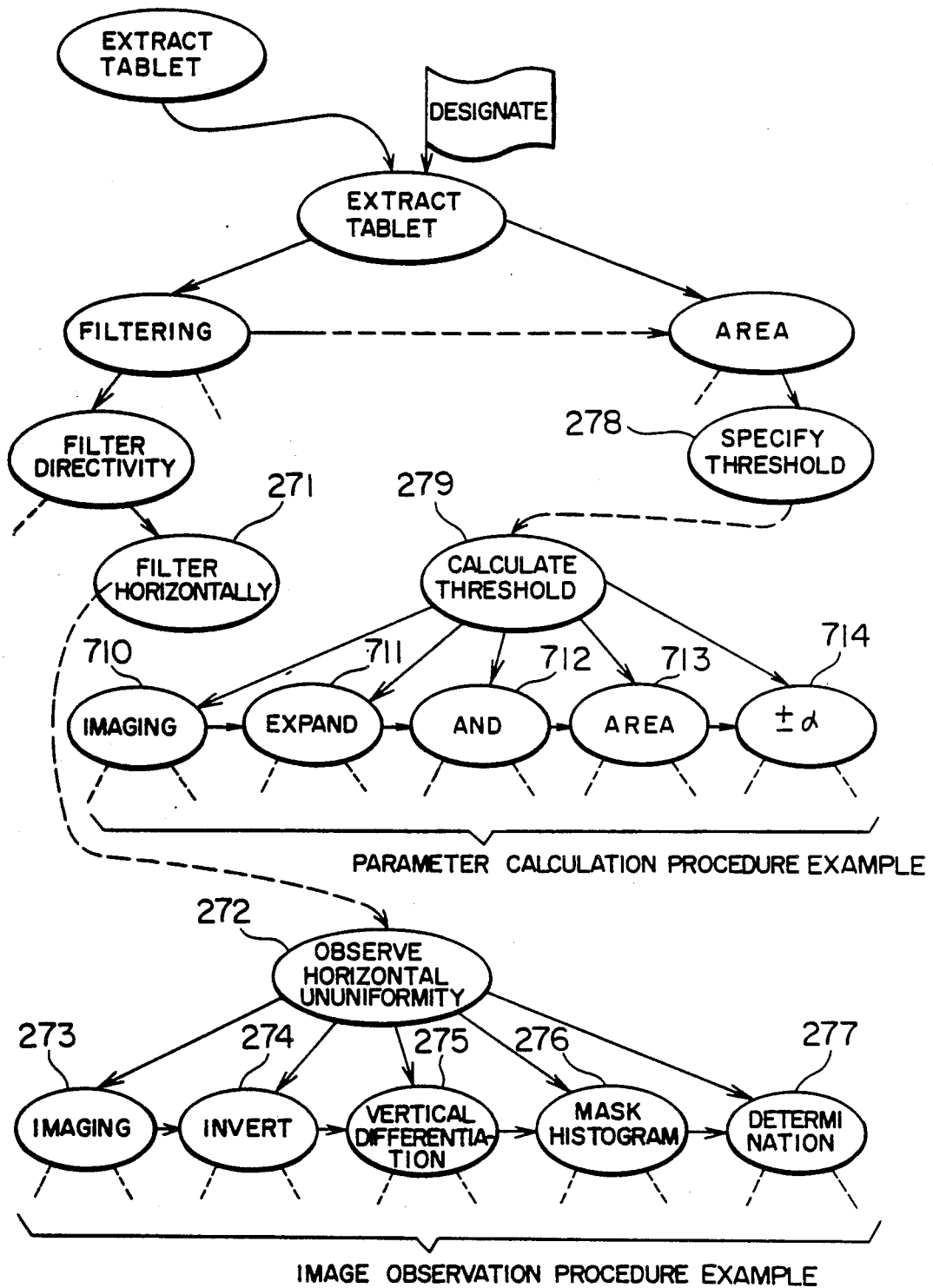
FIG. 20 shows an example of an image characteristic evaluation procedure.

Referring to FIGS. 19 and 20, the operation of the image characteristic evaluation means 227 is explained. The configuration of the image characteristic evaluation means 227 of the present embodiment is explained with reference to FIG. 19.

The image characteristic evaluation means 227 comprises an imaging module 262 for a designated area for developing an outline binary image or a painted binary image from a designated area pattern data 261 into a binary image memory 263, an image operation module 264 for expanding or contracting a binary image, logically ANDing images and filtering a dither image by using a binary image memory 263 or a dither image memory 265, a characteristic calculation module 266 for calculating a characteristic of a vector element such as an area for each label based on a binary image projection histogram and a dither image histogram, or a dither image having the object labeled, calculating a dispersion and an average of characteristics of the vector elements, calculating a characteristic of scalar elements such as an area of the binary image, and supplying the characteristic of the scalar elements to the deduction means 226, and a decision module 267 for determining whether the scalar characteristics meet the magnitude relationship to the thresholds, supplying the decision result to the deduction means 226, determining whether the characteristic such as the area for each label meets the magnitude relationship to the threshold and determining one of the labels which may be the object. The operation module 264, characteristic calculation module 266 and characteristic decision module 267 mutually exchange the data as shown by arrows and as is done in the conventional image processing. Accordingly, by combining those functional modules in a predetermined procedure, the conventional area extraction is attained.

The operation of the image characteristic evaluation means 227 is explained with reference to an image characteristic evaluation procedure shown in FIG. 20.

In the present embodiment, the image characteristic evaluation procedure is described in the same form as the knowledge base, although the production rule is not used. For example, if the use of the tablet extraction module has been decided, the area of the tablet has been designated, the condition part of the production rule of the horizontal filtering module 271 is to be evaluated, and it has the image observation of "check if the background has horizontal non-uniformity or not", then the deduction means 226 selects the corresponding procedure from the image characteristic evaluation procedure group 223 and supplies it to the image characteristic evaluation means 227. If the means 227 is the module configuration and execution sequence as shown by the horizontal filtering modules 271-277 of FIG. 20, the imaging module 273 is first decoded and the painted image as shown by the binary image memory 263 is produced by the designated area imaging function module 262. Then, an inversion module 274 is decoded and an inverted image of the binary image 263, that is, the background binary image is produced by the operation module 264. Then, a vertical differentiation module 275 is decoded, and the input image 265 is vertically differentiated by the operation module 264. Then, a mask histogram module 276 is decoded and a histogram of the differentiated image is calculated by using the background binary image as a mask by the characteristic calculation module 266. If the background includes no horizontal non-uniformity, the histogram will concentrate in a low level. A ratio of a sum of frequencies of low or high levels and a total area of the background is calculated by the characteristic calculation module 266. Finally, a decision module 277 is decoded and the characteristic decision module 267 checks if the ratio calculated above meets the magnitude relation to the predetermined threshold, and the result is supplied to the deduction means 226.

When the image characteristic evaluation for the parameter calculation has been defined in the knowledge base module, the operation is as follows. Now, since the operation is considerably similar to that of the internal construction of the image characteristic evatuation means 227 in the case of the image observation, it is explained with reference to the parameter calculation procedure shown in FIG. 20.

By way of example, a parameter calculation procedure for a threshold determination module 278 of an area module is explained. A binary image having a tablet painted is produced by the imaging module 710. If the user exactly designates the tablet, the image thereof may be directly used, but it is considered that there is a certain error included, and the exact binary image of the tablet is produced from the binary image resulted from sequentially processing the input image. The tablet binary image produced by the imaging module 710 is expanded by the expansion module 711. Then, the expanded binary image and the binary image resulted from the previous processing are ANDed (A-D) by the AND module 712 to produce the actual tablet binary image. The area of the binary image is calculated by the area module 713. Finally, a certain width is given thereto by the $\pm \alpha$ module 714 and it is used as a threshold.

In accordance with the present embodiment, the image characteristics, particularly those which have been heretofore evaluated by visual observation or data analysis by the expert can be machine-internally evaluated. Thus, the image characteristics can be quantatively evaluated. The image characteristics which have heretofore been evaluated through interaction with the user can be evaluated by the inquiry, and the pattern area can be designated for evaluation. Thus, the image processing expert system having the same deduction capability as the image processing expert is provided.

The present embodiment relates to the image processing expert system which permits preferred and easy area extraction. As described above, the image characteristic includes both density distribution and geometrical characteristic, and the present embodiment is applicable to the normalization and area extraction by the density distribution characteristic and the area extraction by the geometrical characteristic.

We claim:

1. An interactive image processing method comprising the steps of preparing image characteristics of objects to be identified from entire image areas and procedures having steps and/or parameters for extracting an object, wherein each procedure includes steps for effecting at least spatial filtering, binarization and a binary-image processing; selecting a corresponding one of said procedures for extracting a respective object by comparing an image characteristic of an externally applied input image with the corresponding prepared image characteristics; and making an external inquiry for inputting the image characteristic of the input image so as to effect in at least an alternative selection from combinations of different ones of said procedure steps as to the appropriate object extraction procedure from said prepared procedures, wherein said method further comprising the steps of:

designating a limited area on a display having substantially uniform characteristics from an input image of multiple gray levels and containing at least an object to be identified and a corresponding background area;

extracting information related to the image characteristics from said object and the corresponding background area representing said designated limited area;

evaluating the input image characteristics in accordance with said extracted information and a corresponding one of said prepared procedures for image evaluation of said object; and determining said object extraction procedure from the input image characteristics based on a combination of an interactive response to said inquiry and the result of said image characteristic evaluation.

2. An interactive image processing method according to claim 1, wherein said step of extracting information includes effecting a binarization threshold and a localized filtering by extracting a density distribution characteristics.

3. An interactive image processing method according to claim 1, wherein the image characteristic corresponding to said extracted information includes a density distribution characteristic and a geometrical characteristic.

4. An interactive processing system comprising:

knowledge memory means for storing a plurality of prepared sets of image characteristics of objects to be identified and procedures having different steps and/or parameters for extracting the objects, wherein each procedure includes steps for effecting at least spatial filtering, binarization and a binary-image processing;

deduction means for comparing an image characteristic of an externally entered input image with the image characteristics stored in said knowledge memory means to determine a procedure which is to be used from the prepared procedures stored in said knowledge memory means for extracting an object to be identified;

area designation means for designating a limited area on a display in the input image containing an object to be identified;

inquiry means interactively coupled to said area designation means and said deduction means for effecting an external inquiry concerning the image characteristic of the input image and in turn applying an external response to said deduction means;

image characteristic evaluation means for evaluating the input image characteristics in accordance with predetermined procedures, using designated area information derived from said area designation means; and wherein the results of said inquiry means and said image characteristic evaluation means in combination are applied to said deduction means to determine procedural conditions for extracting the object to be identified based on the image characteristic of the input image from combinations of said different procedure steps.

5. An interactive image processing system according to claim 4, wherein said image characteristics include a density distribution characteristic and a geometrical characteristic.

6. An interactive image processing system according to claim 5, wherein said density distribution characteristic and geometrical characteristic is used to determine a binarization threshold and localized filtering.

7. An interactive image processing system according to claim 4, wherein said inquiry means inquires in the form of a message in accordance with inquiry information on an image characteristic stored in said knowledge memory and supplies an image characteristic of the input image to said deduction means.

8. An interactive image processing system according to claim 4, wherein said area designation means includes a coordinate input device to designate an area coordinate of the coordinate input device corresponding to the input image.

9. An interactive image processing system according to claim 4 wherein conditions for extracting said object area are defined by procedures or parameters for performing said image processing on the designated area.

10. An interactive image processing system according to claim 4, wherein said area designation means designates a limited area from an input image of multiple gray levels.

* * * * *